United States Patent
Wakabayashi

(10) Patent No.: US 6,952,167 B2
(45) Date of Patent: Oct. 4, 2005

(54) NONCONTACT COMMUNICATION MEDIUM AND NONCONTACT COMMUNICATION SYSTEM

(75) Inventor: Naoyuki Wakabayashi, Kyoto (JP)

(73) Assignee: OMRON Corporation, Kyoto (JP)

( * ) Notice: Subject to any disclaimer, the term of this patent is extended or adjusted under 35 U.S.C. 154(b) by 224 days.

(21) Appl. No.: 10/344,375

(22) PCT Filed: Jun. 11, 2001

(86) PCT No.: PCT/JP01/04923

§ 371 (c)(1),
(2), (4) Date: Feb. 11, 2003

(87) PCT Pub. No.: WO02/15124

PCT Pub. Date: Feb. 21, 2002

(65) Prior Publication Data

US 2003/0178483 A1 Sep. 25, 2003

(30) Foreign Application Priority Data

Aug. 15, 2000 (JP) ........................................ 2000-246349

(51) Int. Cl.[7] .................... H04M 11/04; G08B 13/14; G06K 7/00; G06K 7/08; G06K 19/06
(52) U.S. Cl. ................. 340/572.5; 340/310.1; 340/310.2; 340/310.3; 340/310.4; 340/571; 340/825.49; 340/825.54; 235/439; 235/449; 235/451; 235/491; 235/492
(58) Field of Search .............. 340/310.1–310.4, 340/571–572, 572.5, 825.54, 825.49; 235/439, 449, 451, 491, 492

(56) References Cited

U.S. PATENT DOCUMENTS

| | | | | |
|---|---|---|---|---|
| 5,721,535 A | * | 2/1998 | Ikefuji | 340/10.4 |
| 5,774,062 A | * | 6/1998 | Ikefuji | 340/10.4 |
| 5,804,811 A | * | 9/1998 | Saitoh et al. | 235/492 |
| 6,624,743 B1 | * | 9/2003 | Ikefuji et al. | 340/10.4 |

FOREIGN PATENT DOCUMENTS

| | | |
|---|---|---|
| DE | 3922977 A | 1/1991 |
| DE | 4327642 A1 | 11/1994 |

(Continued)

*Primary Examiner*—Jeffery Hofsass
*Assistant Examiner*—Lam Pham
(74) *Attorney, Agent, or Firm*—Dickstein Shapiro Morin & Oshinsky LLP

(57) ABSTRACT

An output of a resonant circuit 60 which electromagnetically couples with an external communications apparatus is rectified and taken out, and a resultant output voltage V is monitored by a switch control circuit 61. After the output voltage V has risen to or beyond a threshold Vth1, a switch element SW is turned on and off, and a state of the switch element SW in which the output voltage V becomes higher is determined. While holding the switch element SW in the state thus determined, a power supply switch element PSW is turned on when the output voltage V has further risen. As a result, even when a plurality of noncontact IC cards 6 overlaid with one another are brought close to the communications apparatus, the individual noncontact IC cards 6 can carry out data communication.

11 Claims, 18 Drawing Sheets

FOREIGN PATENT DOCUMENTS

| | | |
|---|---|---|
| DE | 4438287 C1 | 5/1996 |
| DE | 19614455 A | 10/1997 |
| DE | 19621076 A | 11/1997 |
| EP | 0768540 A | 4/1997 |
| EP | 1014301 A | 6/2000 |
| EP | 1045325 A | 10/2000 |
| EP | 1061663 A | 12/2000 |
| FR | 2757952 A | 7/1998 |
| FR | 2782209 A | 2/2000 |
| GB | 2321726 A | 8/1998 |
| JP | 10-84304 | 3/1998 |
| JP | 10-320519 | 4/1998 |
| JP | H10-126318 | 5/1998 |
| JP | 10-126318 | 5/1998 |
| JP | 10-145987 | 5/1998 |
| JP | 10-269327 | 10/1998 |
| JP | 10-320519 | 12/1998 |
| JP | 2000-123121 | 4/2000 |
| JP | 2001-238372 | 8/2001 |
| WO | IB-WO 01/59951 | 8/2001 |

* cited by examiner (A)

(B)

|  | Switch element SW | Power supply switch PSW element |  |
|---|---|---|---|
| Initial state | OFF | OFF |  |
| State 1 | OFF | OFF |  |
| State 2 | ON/OFF | OFF | Detecting operation |
| State 3 | ON | OFF |  |
| State 4 | OFF | OFF |  |
| State 5 | ON | ON |  |
| State 6 | OFF | ON |  |

FIG. 17
(A)
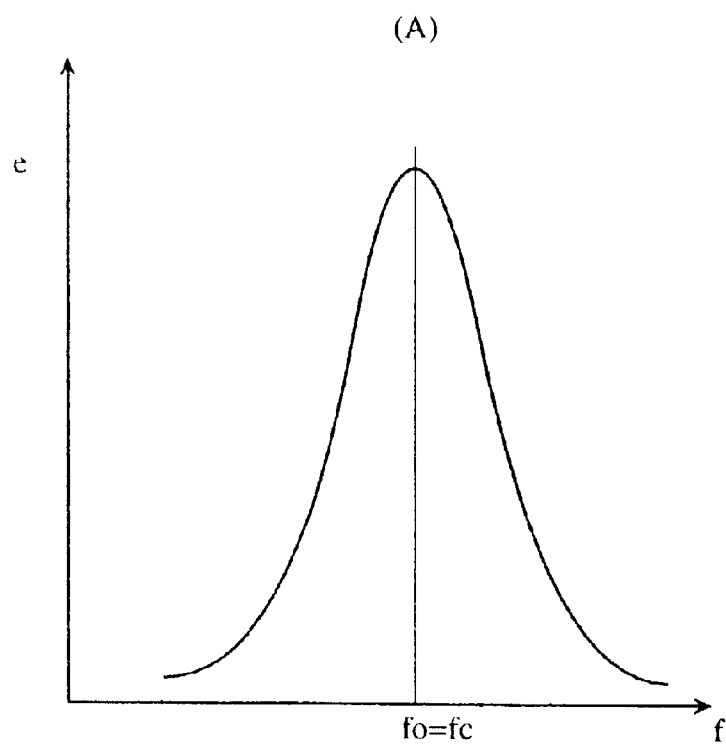
(B)
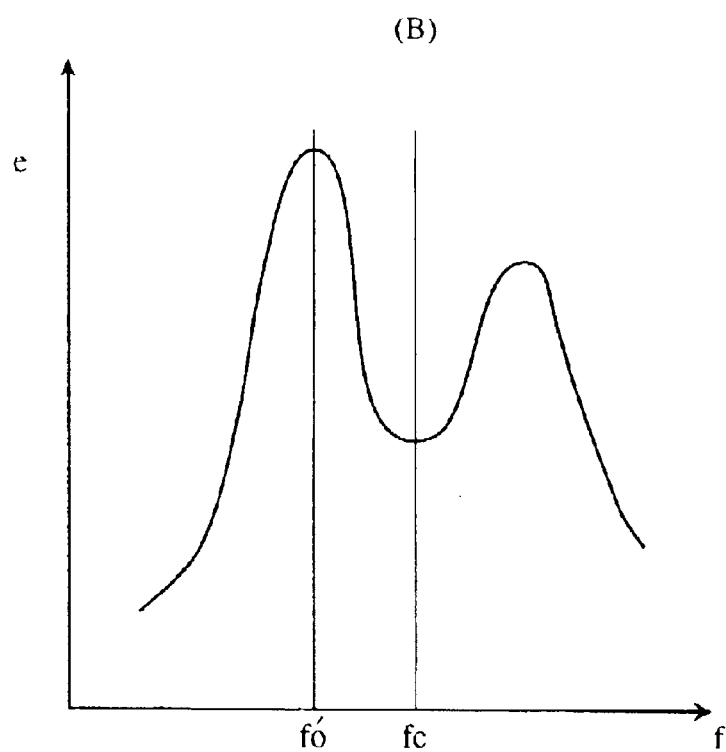

FIG. 18
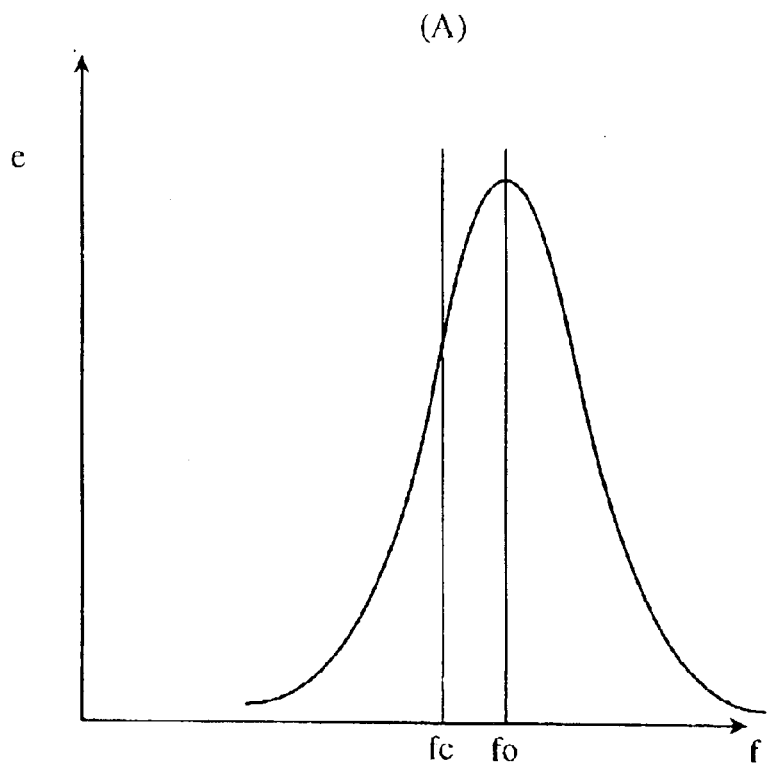
(A)
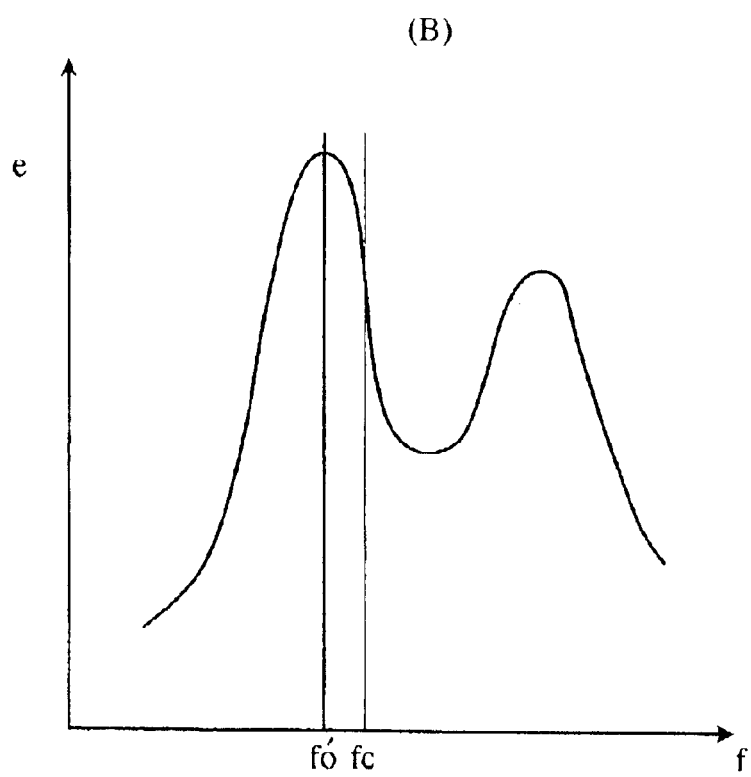
(B)

NONCONTACT COMMUNICATION MEDIUM AND NONCONTACT COMMUNICATION SYSTEM

TECHNICAL FIELD

The present invention relates to noncontact communications media used for noncontact communication. A noncontact communications medium called a smart card, for instance, communicates identification information whose typical examples include an identification number and information about an individual's physical features for authenticating the individual, value information whose typical examples include money information, and credit information used for credit cards, stores these pieces of information, and modifies previously stored information based on those pieces of information. The invention relates also to noncontact integrated circuit (IC) cards which are card-shaped noncontact communications media and to data carriers attached to a human, a vehicle or a baggage when in use, for example. Furthermore, the invention is concerned with noncontact communications systems in which a noncontact communications medium communicates with an identification apparatus such as a personal authentication apparatus, an automatic ticket checker, an automated teller machine which handles cash or electronic cash, or a charge collecting machine.

BACKGROUND ART

A noncontact IC card is provided with a resonant circuit. When an antenna coil which is part of the resonant circuit is moved to cross a magnetic flux generated from an information read/write device, an induced electromotive force occurs from the antenna coil and the resonant circuit produces a high voltage. When the noncontact IC card is brought close to an antenna section of the information read/write device and caused to receive electromagnetic waves from the antenna section, the resonant circuit is brought to a state of resonance. Data communication is carried out between the information read/write device and the noncontact IC card using the state of resonance. Also, the voltage produced as a result of resonance of the resonant circuit is used to supply electric power to other circuits causing those circuits to operate.

Let us now consider actual conditions of use of the noncontact IC card. Since noncontact IC cards used as railway commuter passes, cash cards used at banks and credit cards used for shopping, for example, are so thin that a plurality of noncontact IC cards of this kind are held overlaid in a wallet or a pass holder and brought close to an antenna section of an information read/write device in many applications.

Since two or more noncontact IC cards are overlaid with each other when in use in this case, resonant frequencies of the individual noncontact IC cards deviate from carrier frequency of a signal transmitted from the information read/write device due to mutual inductance between the noncontact IC cards. As a result, there can arise a case where the voltage produced in the resonant circuit drops and electric power sufficient for signal reception is not supplied to internal circuits of the noncontact IC card in use, leading to an inability to perform communication between the information read/write device and the noncontact IC card.

This phenomenon is now explained using FIG. 17. The horizontal axis of a graph of FIG. 17 represents the frequency of a resonant circuit of a noncontact IC card. The vertical axis indicates the absolute value of a receiving voltage occurring in the resonant circuit. This is similarly applied to the horizontal axis and the vertical axis of a later-described graph of FIG. 18.

FIG. 17(A) shows a relationship between frequency and receiving voltage that occur when one noncontact IC card is brought close to an information read/write device. In this case, the noncontact IC card is used alone. For this reason, resonant frequency f0 of the resonant circuit matches carrier frequency fc of a carrier signal transmitted from the information read/write device, and a high receiving voltage occurs at that frequency.

FIG. 17(B) shows a relationship between frequency and receiving voltage that occur when two noncontact IC cards are overlaid with each other and brought close to the information read/write device. In this case, the two noncontact IC cards are overlaid and are subject to the influence of mutual inductance between the two noncontact IC cards, so that the resonant frequency of the resonant circuit varies and, as depicted in the Figure, the resonant frequency f0' deviates from the carrier frequency fc of the carrier signal from the information read/write device. For this reason, a low receiving voltage occurs at the carrier frequency fc as compared to the receiving voltage at the resonant frequency f0'. As a result, there arises a problem that sufficient electric power is not supplied to internal circuits of the noncontact IC card in use, leading to an inability to perform communication between reader/writer and the noncontact IC card.

To solve the aforementioned problems, it has been proposed to preset the resonant frequency of the noncontact IC card such that it deviates to a higher frequency as compared to the carrier frequency. According to this method, the resonant frequency does not deviate so much from the carrier frequency even if the resonant frequency decreases when two noncontact IC cards are overlaid with each other and, therefore, it is possible to supply sufficient electric power to the internal circuits of the noncontact IC card in use.

This method is described referring to FIG. 18. The noncontact IC card is set such that the resonant frequency f0 of its resonant circuit is higher than the carrier frequency fc as shown in FIG. 18(A) when the single noncontact IC card is used.

Shown in FIG. 18(B), on the other hand, is a case where two noncontact IC cards overlaid with each other are used. Since the two noncontact IC cards are used together and the two noncontact IC cards are subject to the influence of mutual inductance, the resonant frequency f0' becomes lower than the carrier frequency fc.

Regardless of whether the single noncontact IC card is used or the two noncontact IC cards are used together, however, the resonant frequency f0, f0' does not deviate so much from the carrier frequency fc as compared to the aforementioned case described with reference to FIG. 17. It is therefore possible to decrease the drop of induced electromotive force compared to the case described with reference to FIG. 17.

Another previously proposed method is such that a switch is series-connected to the resonant circuit and a judgment is made to determine whether the noncontact IC card is overlaid with another noncontact IC card by monitoring the voltage of the resonant circuit while turning on and off the switch at random. If it is judged that the noncontact IC cards are overlaid with each other, the switch of one of the noncontact IC cards is turned off and the resonant circuit of the other noncontact IC card brought to a state of resonance. In this method, one noncontact IC card is in the state of resonance while the other noncontact IC card is not in the state of resonance when they are overlaid.

With this arrangement, it is possible to obtain the same receiving voltage as would be obtained when one of the noncontact IC cards is used alone. In addition, the other noncontact IC card can receive energy of the resonant circuit of the first noncontact IC card thanks to electromagnetic coupling caused by mutual inductance. Thus, either of the two noncontact IC cards can obtain the intended voltage (Japanese Laid-open Patent Publication No. 10-126318).

Either of the aforementioned methods, however, has drawbacks stated below:

(1) According to the method of offsetting the resonant frequency of a noncontact IC card from the carrier frequency, the resonant frequency is offset from the carrier frequency even when the single noncontact IC card is used. Thus, the induced electromotive force decreases as much as the amount of frequency offset and the communication range decreases.

(2) According to the method of randomly turning on and off the switch connected to the resonant circuit, it is necessary to keep a receiver section and a clock circuit inside the noncontact IC card operating continuously to detect whether the noncontact IC card is overlaid with another one. For this reason, power consumption of the noncontact IC card increases and it requires a large magnetic field. It is necessary for the noncontact IC card to communicate at a short range in order that it can receive this large magnetic field.

It is an object of the invention to provide noncontact communications media which can communicate when multiple noncontact communications media are overlaid.

It is another object of the invention to provide noncontact communications systems using the aforementioned noncontact communications media.

DISCLOSURE OF THE INVENTION

To solve the foregoing problems, a noncontact communications medium of this invention has the following structure.

The noncontact communications medium comprises a resonant circuit including an antenna coil which generates an induced electromotive force by receiving electromagnetic waves carrying information as a result of changes in the amount of electric power and thereby transmits and receives signals, and two capacitors parallel-connected to the antenna coil;

a main circuit which processes a received signal obtained by demodulating an output of the aforesaid resonant circuit and outputs a modulated transmitting signal to the aforesaid resonant circuit;

a switch section which switches first one of the aforesaid two capacitors between a connected state and a disconnected state; and a switch control section which controls switching operation of the aforesaid switch section according to the amount of an output voltage occurring in the aforesaid resonant circuit and according to a specific change in the aforesaid output voltage;

wherein the aforesaid switch control section controls the switching operation of the aforesaid switch section according to a change in a rising edge of the aforesaid output voltage when the output voltage occurring in the aforesaid resonant circuit is equal to or higher than a specific value.

In the noncontact communications medium of the above structure, when the antenna coil receives electromagnetic waves of a specific frequency, the resonant circuit resonates and a voltage Q times as high as the induced electromotive force occurs, where Q is the quality factor. The resonant circuit is a parallel-resonant circuit provided with the antenna coil and two capacitors. The two capacitors are connected parallel to each other.

The capacitance change control means has a structure for varying the capacitance of the capacitor and is realized by a switch section and a switch control section described below.

The switch section is formed of an analog switch for changing the resonant frequency of the resonant circuit. The analog switch is inserted into the resonant circuit in series with first one of the capacitors. When the switch section is turned on, the two parallel-connected capacitors and the antenna coil together constitute a resonant circuit in a connected state in which they are electrically connected. On the contrary, when the switch section is turned off, there is formed a resonant circuit in another connected state in which the first capacitor and the antenna coil are electrically disconnected and only the second capacitor is electrically connected to the antenna coil. The capacitance of the capacitor of the resonant circuit varies due to on/off operation of the switch section.

The switch control section, which has not been provided in conventional noncontact communications media, controls switching operation of the aforesaid switch section according to the amount of an output voltage occurring in the aforesaid resonant circuit and according to a specific change in the aforesaid output voltage. The aforementioned specific change means a relatively sharp rising edge of the output voltage of the resonant circuit, or a relatively sharp falling edge of the output voltage, that accompanies a change in the electromagnetic waves received by the resonant circuit.

When the single noncontact communications medium is used, the output voltage from the resonant circuit increases to or beyond a specific value if an external communications apparatus with which communication should be carried out and the resonant circuit of the noncontact communications medium are electromagnetically coupled. If a relatively sharp rising edge or a relatively sharp falling edge constituting a specific change in the output voltage occurs when the amount of the output voltage is equal to or larger than the specific value, the switch control section compares the output voltage obtained when the first capacitor is set to the connected state by controlling the switch section with the output voltage obtained when the first capacitor is set to a disconnected state, and judges in which state the output voltage becomes higher.

If the capacitances of the two capacitors are determined such that the resonant frequency of the resonant circuit and the frequency of the electromagnetic waves received by the antenna coil approximately match each other when the aforesaid first capacitor is in the connected state, the output voltage of the resonant circuit becomes higher when the first capacitor is set to the connected state. The switch control section holds the switch section in the state in which the output voltage has become higher. Thus, the first capacitor is held in the connected state. As a consequence, the noncontact communications medium can maintain a state of resonance of the resonant circuit and supply sufficient electric power to the main circuit, so that the noncontact communications medium can carry out stable noncontact communication with the communications apparatus.

On the other hand, if there are two noncontact communications media, each having a card shape, for example, and the two media overlaid with each other are brought close to a communications apparatus to achieve electromagnetic coupling, the output voltage of the resonant circuit of each noncontact communications medium rises to or beyond a specific value. In each of the two noncontact communications media, if a specific change in the output voltage occurs when the output voltage is equal to or higher than the specific value, the switch control section compares the output voltage obtained when the first capacitor is set to the connected state by controlling the switch section with the output voltage obtained when the first capacitor is set to the disconnected state, and judges in which state the output voltage becomes higher.

Since the aforementioned specific change accompanies a change in the electromagnetic waves received by the resonant circuit, it is possible to synchronize the beginning of controlling the on/off operation of the switch sections performed by the switch control sections of the two noncontact communications media.

There is mutual inductance between the resonant circuits of the two noncontact communications media. For this reason, if the capacitance of the second capacitor is determined such that the resonant frequency of the resonant circuit and the frequency of the electromagnetic waves received by the antenna coil approximately match each other in each noncontact communications medium when the two noncontact communications media whose first capacitors are set to the disconnected state are overlaid with each other, the output voltage of the resonant circuit becomes higher when the first capacitor is set to the disconnected state in each noncontact communications medium. The switch control section holds the switch section in the state in which the output voltage has become higher. Thus, the first capacitor is held in the disconnected state. As a consequence, the two noncontact communications media can maintain a state of resonance of the resonant circuits and supply sufficient electric power to the main circuits, so that the two noncontact communications media can carry out stable noncontact communication with the communications apparatus.

The resonant frequency of the resonant circuit becomes lower when three noncontact communications media are overlaid than when two noncontact communications media are overlaid. Thus, the capacitance of the second capacitor may be determined such that the resonant frequency of the resonant circuit becomes slightly higher than the frequency of the electromagnetic waves received by the antenna coil when two noncontact communications media whose first capacitors are set to the disconnected state are overlaid with each other. If this arrangement is used, the resonant frequency of the resonant circuit does not greatly deviate from the frequency of the electromagnetic waves in each noncontact communications medium when the aforesaid first capacitor is in the disconnected state, regardless of whether two noncontact communications media are overlaid or three noncontact communications media are overlaid. For this reason, either when two noncontact communications media are overlaid, or when three noncontact communications media are overlaid, it is possible to avoid a decrease in the output voltage of the resonant circuit of each noncontact communications medium and each noncontact communications medium, so that the individual noncontact communications media can carry out stable noncontact communication with the communications apparatus.

Again, the capacitances of the two capacitors are to be determined such that the resonant frequency of the resonant circuit and the frequency of the electromagnetic waves received by the antenna coil approximately match each other in this case when the single noncontact communications medium is used with the aforesaid first capacitor in the connected state. With this arrangement, the communication range of the noncontact communications medium does not decrease when used alone.

To increase the resonant frequency of the resonant circuit of each noncontact communications medium when two noncontact communications media whose first capacitors are in the disconnected state are overlaid with each other, the capacitances of the second capacitors should be made slightly small. This would be achieved if the capacitances of the first capacitor is made slightly larger and the frequency of the aforesaid electromagnetic waves and the resonant frequency of the aforesaid resonant circuit are made approximately equal to each other.

The noncontact communications media become easier to overlay with each other and accommodate in a wallet or a pass holder by shaping them into a card form.

Also, it is possible to make batteries unnecessary if the output voltage of the resonant circuit is used as electric power for the noncontact communications medium itself.

Furthermore, since the electric power for operating the main circuit is supplied after the amount of the output voltage of the resonant circuit has reached a sufficient voltage for operating the main circuit, it is possible to prevent malfunction of the main circuit potentially caused by insufficient electric power.

Furthermore, since the electric power is not supplied to the main circuit under the control of the switch control section until the amount of the output voltage of the resonant circuit occurring in the resonant circuit reaches a sufficient voltage for operating the main circuit, power consumption in the noncontact communications medium is low during that waiting period. Therefore, even if the noncontact communications medium is present within the communication range, in which the main circuit can communicate, and the output voltage of the noncontact communications medium is low, the switch control section operates, making it possible to determine the output of the switch control section. Then, the noncontact communications medium whose switch control section has been determined detects that an output voltage sufficient for operating the main circuit has occurred in the resonant circuit when the noncontact communications medium has been brought to the communication range at which the main circuit can operate. Since the noncontact communications medium begins to supply electric power for operating the main circuit by detecting this output voltage, the noncontact communications medium immediately begins to operate when it enters the communication range.

It is preferable that the switch control section be held in the disconnected state in an initial state. This is because the analog switch is in its OFF state when the voltage of the electric power is equal to or lower than a specific voltage.

BRIEF DESCRIPTION OF THE DRAWINGS

FIG. 17 is a diagram for explaining a conventional noncontact IC card; and

FIG. 18 is a diagram for explaining a conventional noncontact IC card.

BEST MODES FOR CARRYING OUT THE INVENTION

Figure 1:
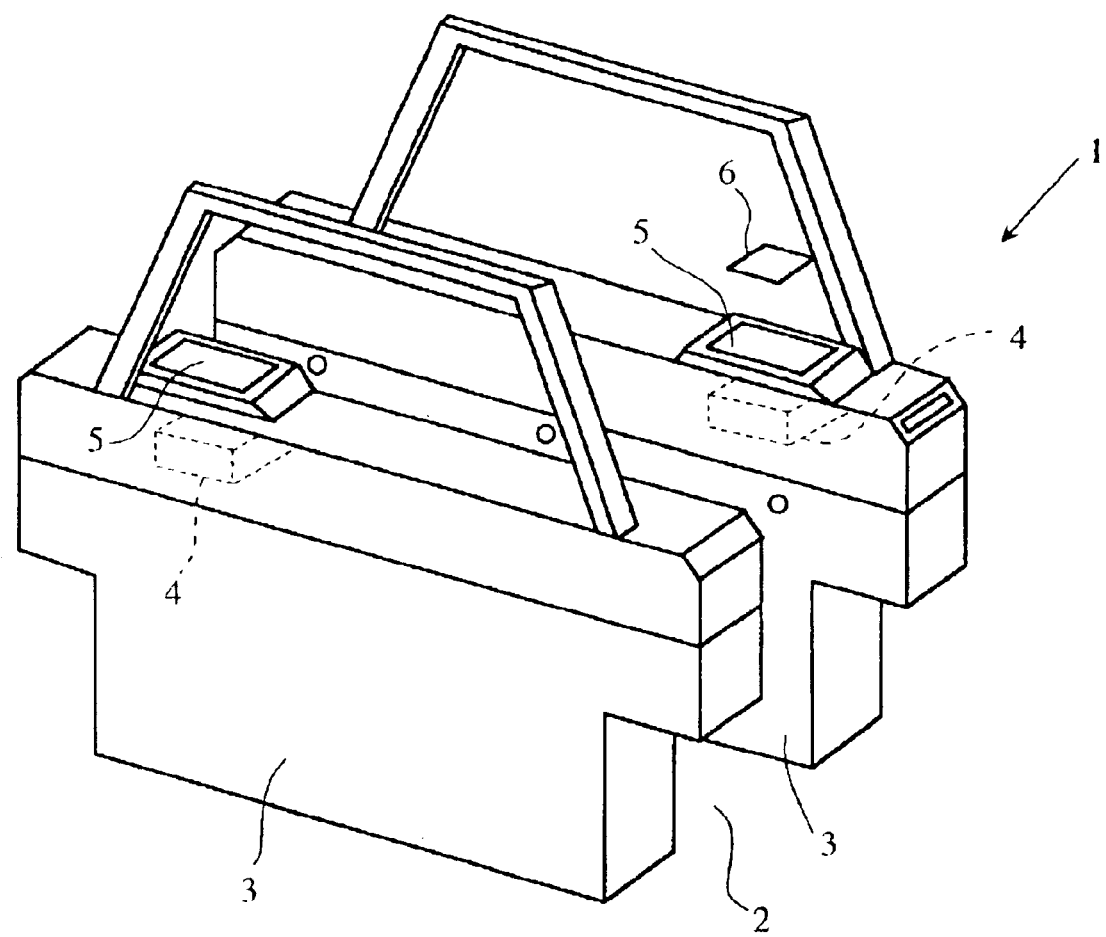
FIG. 1 is an external view of a noncontact automatic ticket checker which uses a noncontact IC card according to an embodiment of this invention.

FIG. 1 shows a noncontact IC card which is a noncontact communications medium according to an embodiment of the invention and a noncontact automatic ticket checker which performs radio communication with the noncontact IC card.

This automatic ticket checker 1 comprises a pair of ticket checker units 3 facing each other on both sides of a ticket checker passage 2. There are provided doors (not shown) on side surfaces of the individual ticket checker units 3 for allowing or prohibiting passage of a user through the ticket checker passage 2.

The ticket checker units 3 are each provided with an information read/write device 4. An antenna section 5 constituting part of the information read/write device 4 is provided on a top surface of each ticket checker unit 3 so that a wide area of communicability is obtained. When a noncontact IC card 6 used as a ticket is placed within the communicability area of the information read/write device 4, noncontact data communication is performed between the noncontact IC card 6 and the information read/write device 4. More specifically, when a passenger, who is the user carrying the noncontact IC card 6, places it within the communicability area formed by the antenna section 5 of the information read/write device 4, the noncontact IC card 6 performs noncontact data communication concerning boarding information with the information read/write device 4. The automatic ticket checker 1 controls door opening/closing actions in accordance with the results of this communication, thereby allowing or prohibiting passage of the user such as the passenger.

Figure 2:
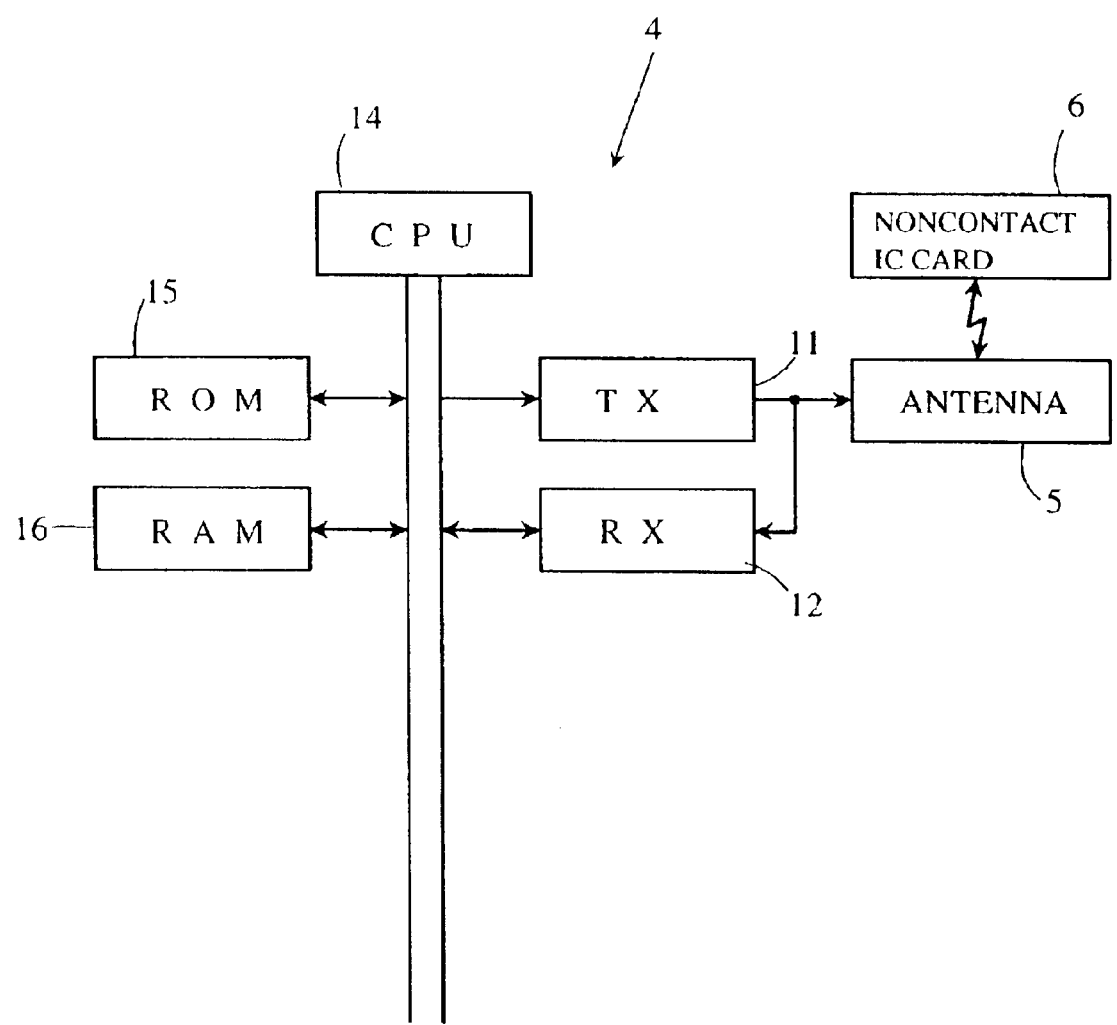
FIG. 2 is a configuration diagram of a boarding information read/write device.

FIG. 2 is a configuration diagram of the aforementioned information read/write device 4.

The information read/write device 4 includes the antenna section 5, a transmitter section 11, a receiver section 12, a central processing unit (CPU) 14, a read-only memory (ROM) 15, and a random-access memory (RAM) 16.

The transmitter section 11 generates a carrier for transmitting electric power to the noncontact IC card 6 and a high-frequency signal by modulating the aforementioned carrier for transmitting data, and supplies them to the antenna section 5.

The receiver section 12 demodulates a signal received by the antenna section 5.

The antenna section 5 is provided with a resonant circuit formed of an antenna coil and capacitors. The antenna section 5 transmits the modulated carrier fed from the transmitter section 11 in the form of electromagnetic waves via the resonant circuit. When the noncontact IC card 6 approaches the antenna section 5, the noncontact IC card 6 receives the electromagnetic waves from the antenna section 5 and a resonant circuit provided in the noncontact IC card 6 produces a voltage. The configuration of the noncontact IC card 6 will be later described. The noncontact IC card 6 utilizes the voltage generated at this time as a power source. The noncontact IC card 6 also receives a signal transmitted from the antenna section 5, that is, the high-frequency signal obtained by modulating the carrier. An induced electromotive force generated by the antenna section 5 varies in the receiver section 12 due to changes in a magnetic field extending from the noncontact IC card 6 toward the antenna section 5. This enables the receiver section 12 to receive the signal transmitted from the noncontact IC card 6.

The ROM 15 stores a program necessary for processing operation performed by the CPU 14 as well as data, such as user identification information and identification number of the noncontact IC card 6.

The RAM 16 stores data to be transmitted to the automatic ticket checker 1 as well as data based on the received signal.

The CPU 14 controls individual structural parts of the information read/write device 4 based on the data stored in the ROM 15 and the RAM 16.

Figure 3:
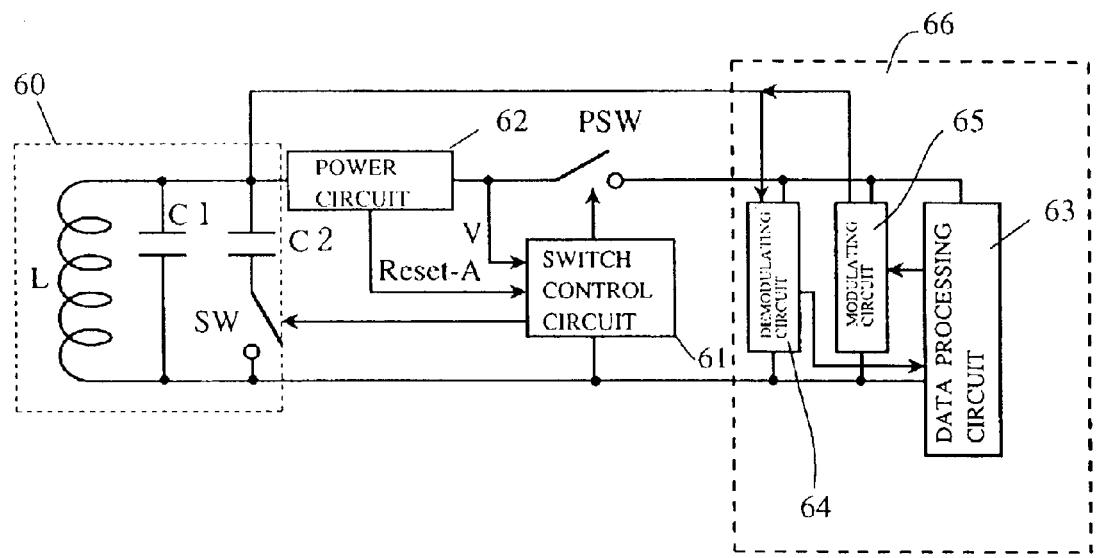
FIG. 3 is a configuration diagram of the noncontact IC card.

FIG. 3 is a configuration diagram of the noncontact IC card.

This noncontact IC card 6 includes an antenna coil L, two capacitors C1, C2, a switch element SW, a power circuit 62, a power supply switch element PSW, a switch control circuit 61, a demodulating circuit 64, a modulating circuit 65 and a data processing circuit 63.

A resonant circuit 60 is formed of the antenna coil L and the two capacitors C1, C2. The capacitor C1 and the capacitor C2 are connected parallel to each other. Further, these capacitors C1, C2 are parallel-connected to the antenna coil L. The resonant circuit 60 is a parallel-resonant circuit formed of a coil and capacitors. The switch element SW is series-connected to the capacitor C2. The capacitor C2 is switched between a state in which the capacitor C2 is connected to the resonant circuit 60 and a state in which the capacitor C2 is disconnected from the resonant circuit 60, as the switch element SW is turned on or off. The resonant circuit 60 constitutes an antenna section, and the antenna coil L constitutes an antenna face of the antenna section.

Figure 4:
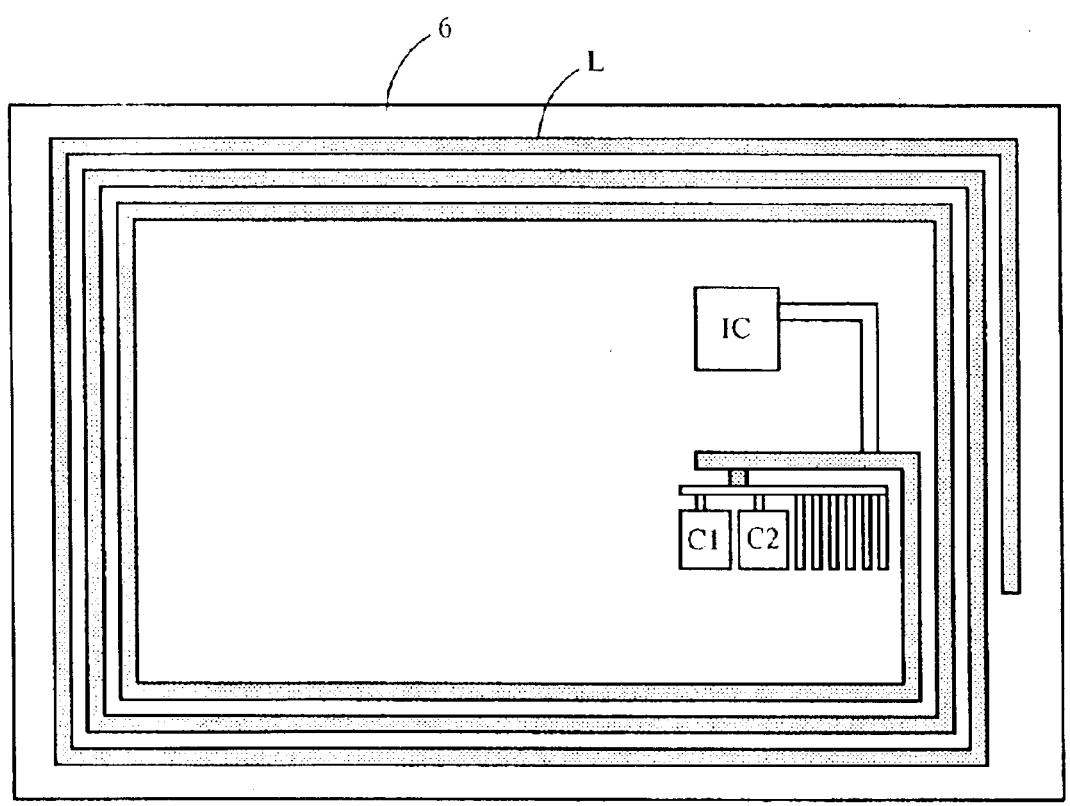
FIG. 4 is an external view of the noncontact IC card.

The antenna coil L is a conductor pattern formed on a surface of the noncontact IC card 6 as illustrated in FIG. 4. The center of the noncontact IC card 6 approximately matches the center of the antenna coil L.

The capacitances of the two capacitors C1, C2 are determined such that the resonant frequency of the resonant circuit 60 when the capacitor C2 is connected to the antenna coil L (when the switch element SW is on) approximately matches the frequency of the electromagnetic waves transmitted from the information read/write device 4. Also, the capacitance of the capacitor C1 is determined such that, when two noncontact IC cards 6 are overlaid with each other, with the capacitor C2 of each noncontact IC card 6 disconnected from the antenna coil L (i.e., the switch element SW is turned off), the resonant frequency of the resonant circuit 60 of each noncontact IC card 6 approximately matches the frequency of the electromagnetic waves transmitted from the ticket checker unit 3 under the influence of mutual inductance between these noncontact IC cards 6.

The switch control circuit 61 produces a capacitor-connected state in which the capacitor C2 is connected to the resonant circuit 60 by controlling the switch element SW to turn on. Also, the switch control circuit 61 produces a capacitor-disconnected state in which the capacitor C2 is disconnected from the resonant circuit 60 by controlling the switch element SW to turn off. The resonant frequency of the resonant circuit 60 varies as a result of turning on and off of the switch element SW.

The capacitor C2 corresponds to what is called a first capacitor in this invention, while the capacitor C1 corresponds to what is called a second capacitor in this invention.

The power circuit 62 produces electric power used in the switch control circuit 61, the demodulating circuit 64, the modulating circuit 65 and the data processing circuit 63 by rectifying ac power generated in the resonant circuit 60 into dc power. The power circuit 62 also delivers a reset signal (Reset-A) which prohibits operation to the switch control circuit 61 when output voltage V of the power circuit 62 is less than a first threshold Vth1. When this reset signal (Reset-A) has been entered, the switch control circuit 61 does not operate when the output voltage V of the power circuit 62 is less than the first threshold Vth1.

The power supply switch element PSW is provided between the power circuit 62 and the demodulating circuit 64, the modulating circuit 65 and the data processing circuit 63. The switch control circuit 61 supplies electric power to the demodulating circuit 64, the modulating circuit 65 and the data processing circuit 63 by controlling the power supply switch element PSW to turn on. Also, the switch control circuit 61 interrupts power supply to the demodulating circuit 64, the modulating circuit 65 and the data processing circuit 63 by controlling the power supply switch element PSW to turn off.

The demodulating circuit 64 demodulates a modulated carrier fed from the resonant circuit 60 and outputs a demodulated signal to the data processing circuit 63.

The modulating circuit 65 modulates a signal fed from the data processing circuit 63 and outputs a resultant signal to the resonant circuit 60.

The data processing circuit 63 stores specific data and performs such operations as to output a specific signal to the modulating circuit 65, store data corresponding to input/output signals, or modify the stored data in accordance with the signal entered from the demodulating circuit 64. Here, the demodulating circuit 64, the modulating circuit 65 and the data processing circuit 63 are referred to as a data processing section 66 as a whole. This data processing section 66 corresponds to what is called a main circuit in this invention.

The aforementioned switch control circuit 61 monitors the output voltage V rectified by the power circuit 62 and controls switching on/off of the switch element SW and the power supply switch element PSW based on the value of the output voltage V.

Figure 5:
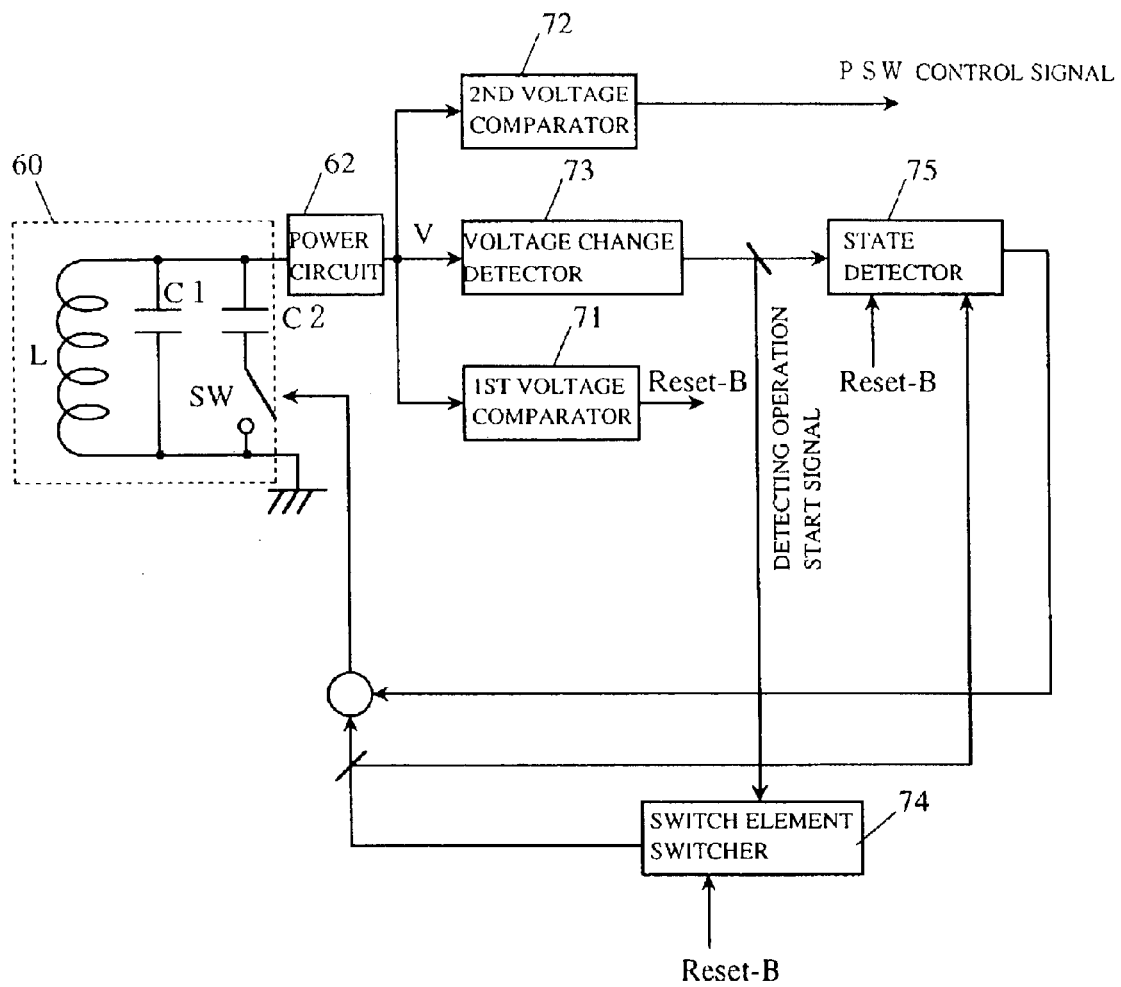
FIG. 5 is a configuration diagram of a switch control circuit.

FIG. 5 is a block diagram showing the functional configuration of the switch control circuit 61, in which the aforementioned reset signal (Reset-A) entered from the power circuit 62 to the switch control circuit 61 is not shown.

The switch control circuit 61 includes a first voltage comparator 71, a second voltage comparator 72, a voltage change detector 73, a switch element switcher 74 and a state detector 75. The first voltage comparator 71 detects whether the output voltage V of the power circuit 62 has risen to or beyond the first threshold Vth1 and outputs a signal (Reset-B) indicating the result of detection. The second voltage comparator 72 detects whether the aforementioned output voltage V has risen to or beyond a second threshold Vth2 and outputs a signal (PSW control signal) indicating the result of detection. This PSW control signal is a signal which switches the power supply switch element PSW between ON and OFF states. The second threshold Vth2 is a voltage higher than the first threshold Vth1, and is a sufficient voltage for operating the data processing section 66. The voltage change detector 73 detects changes in the aforementioned output voltage V. The switch element switcher 74 outputs a signal which turns on and off the switch element SW. When the switch element SW is turned on and off more than once, the state detector 75 compares the aforementioned output voltage V during OFF state and the output voltage V during ON state, judges in which state the output voltage V becomes higher, and outputs the result of detection. This judgment operation is referred to as detecting operation in this context. As will be described later, the noncontact IC card 6 performs this detecting operation when the aforementioned output voltage V is equal to or higher than the first threshold Vth1. Then, the noncontact IC card 6 maintains the state of the switch element SW (ON or OFF state of the switch element SW) in which the output voltage V becomes higher, and waits in that state until the output voltage V becomes equal to or higher than the second threshold Vth2.

Figure 7:
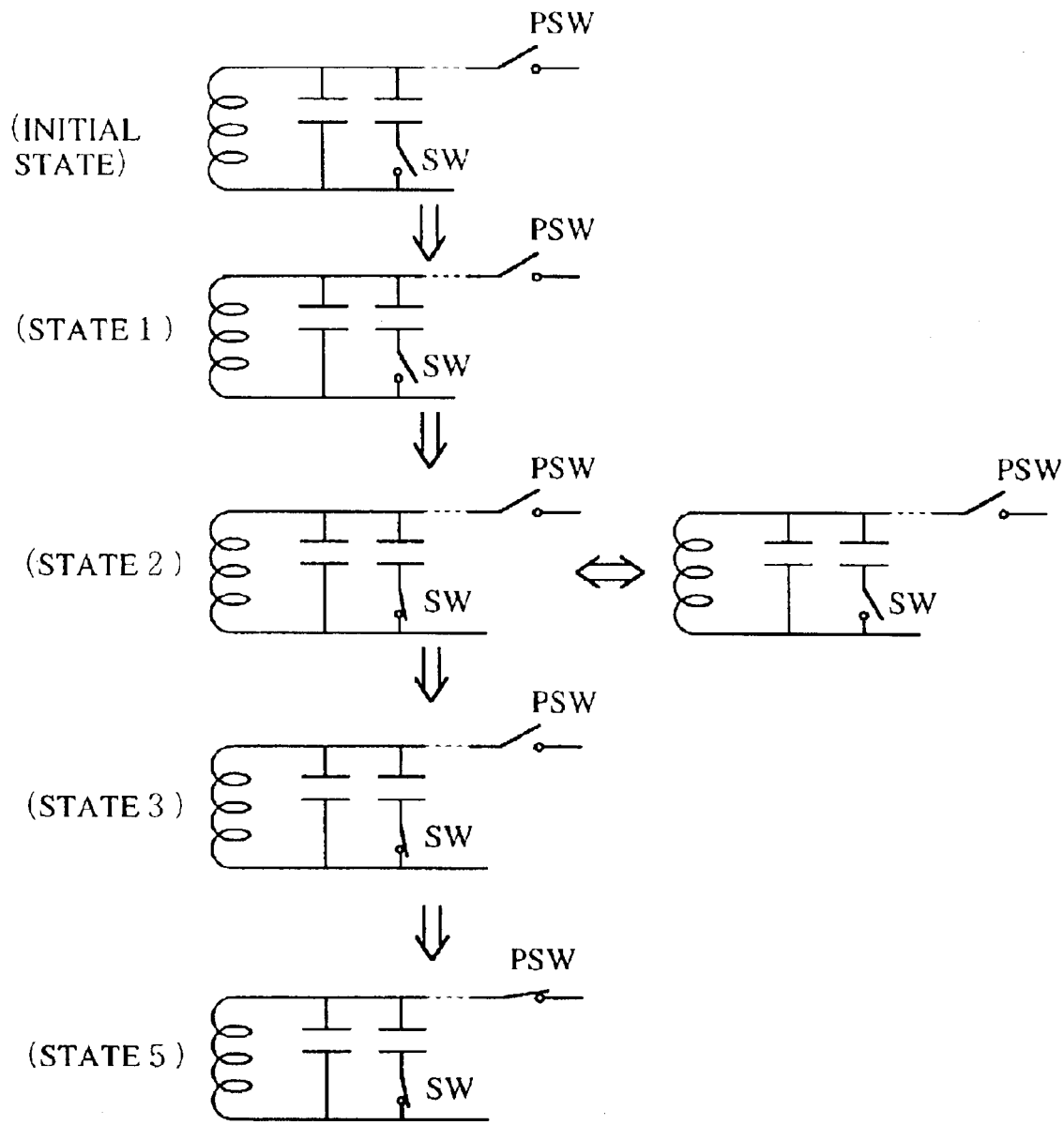
FIG. 7 is a diagram explaining ON/OFF operation of a switch element and a power supply switch element performed until one noncontact IC card becomes ready to operate.
Figure 9:
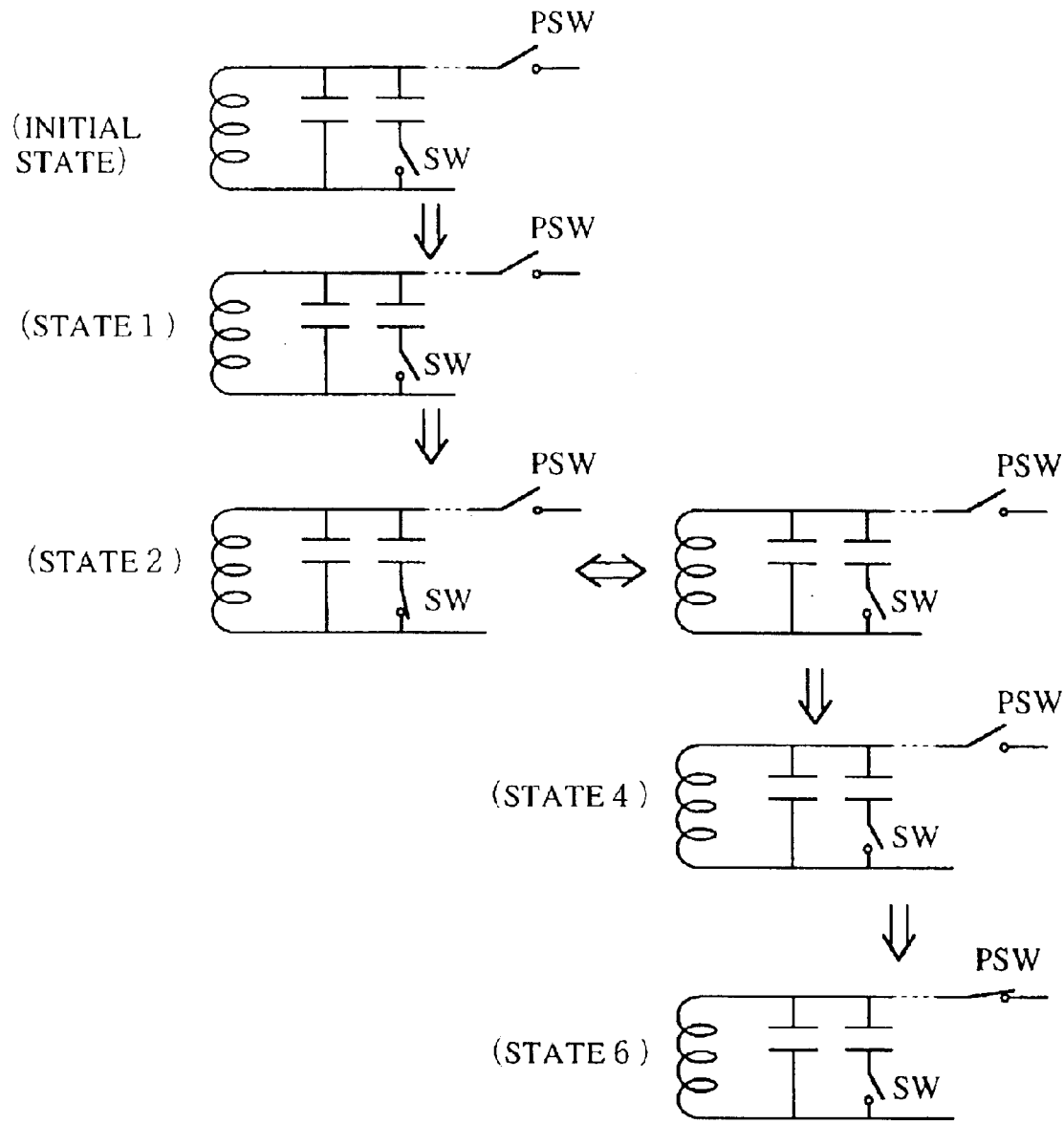
FIG. 9 is a diagram explaining ON/OFF operation of the switch element and the power supply switch element when two noncontact IC cards overlaid with each other are used.
Figure 11:
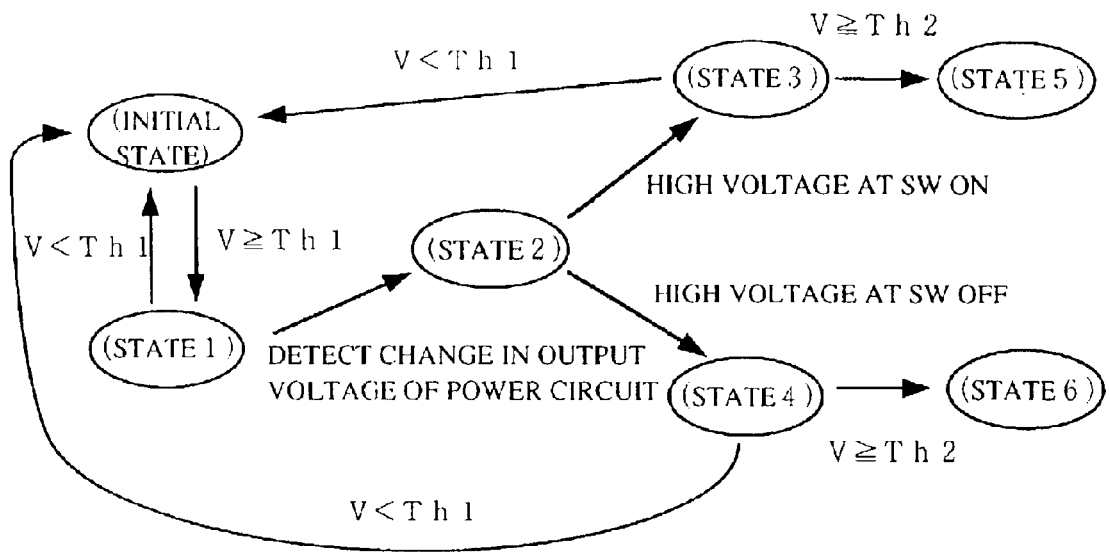
FIG. 11 is a diagram showing transition of the state of the noncontact IC card associated with a diagram showing ON/OFF states of the switch element and the power supply switch element.

Next, the operation of the switch control circuit 61 of the noncontact IC card 6 of the present embodiment is explained. The noncontact IC card 6 of this embodiment is in its initial state when it is kept sufficiently far away from the antenna section 5 of the ticket checker unit 3 and the output voltage V of the power circuit 62 is less than the first threshold Vth1. Reference is made to FIGS. 7, 9 and 11 with respect to this initial state and later-described states 1 to 6. In the initial state, both the switch element SW and the power supply switch element PSW are in their OFF state.

When the output voltage V of the power circuit 62 is less than the first threshold Vth1, the switch control circuit 61 does not operate because the reset signal (Reset-A) which prohibits the operation is entered from the power circuit 62. Thus, when the aforementioned output voltage V is less than the first threshold Vth1, the first voltage comparator 71 would in no case erroneously detect that the aforementioned output voltage V is equal to or higher than the first threshold Vth1 thereby causing the switch control circuit 61 to erroneously start the operation described below.

The output voltage V of the aforementioned power circuit 62 rises as the noncontact IC card 6 approaches the antenna section 5 of the ticket checker unit 3. When the output voltage V becomes equal to or higher than the first threshold Vth1, the power circuit 62 stops to enter the aforementioned reset signal (Reset-A) into the switch control circuit 61. As a result, the switch control circuit 61 of the noncontact IC card 6 starts to operate and the first voltage comparator 71 detects that the aforementioned output voltage V is equal to or higher than the first threshold Vth1. This condition is referred to as state 1 for the convenience of explanation. The state 1 is the condition in which both the switch element SW and the power supply switch element PSW are in their OFF state.

Figure 6:
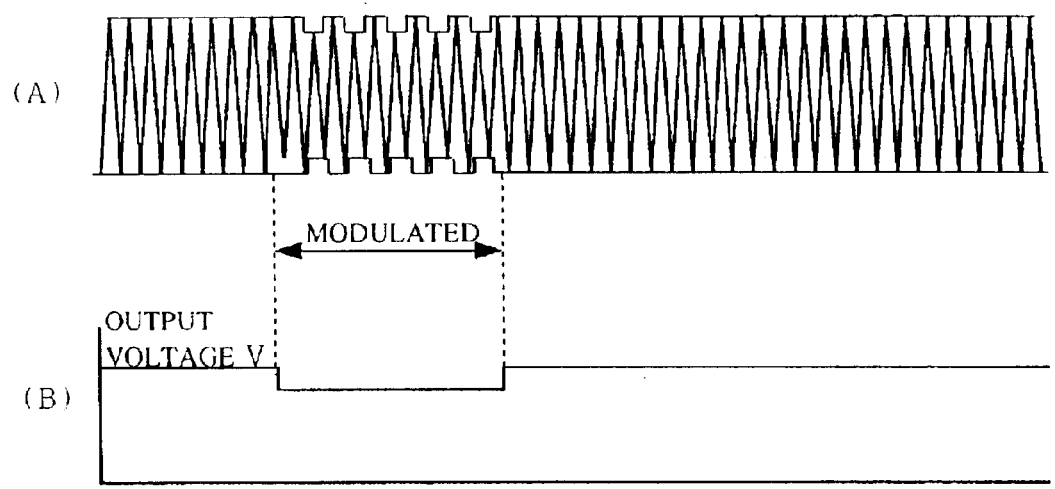
FIG. 6 is a diagram showing electromagnetic waves output from a ticket checker unit and output voltage of a power circuit of the noncontact IC card.

The ticket checker unit 3 transmits a polling command to any noncontact IC card 6 which is placed within the communicability area at specific time intervals (e.g., every 10 ms) requesting the noncontact IC card 6 to return a response. Since the electromagnetic wave transmitted from the ticket checker unit 3 is modulated as shown in FIG. 6(A), the output voltage V of the power circuit 62 slightly drops as shown in FIG. 6(B) at this time. If the detecting operation is performed to determine the state of the switch element SW in which the output voltage V becomes higher by turning on and off the switch element SW more than once while this polling command is being received (during the reception of the modulated wave), it is not possible to judge whether the change in the output voltage V is a voltage change due to ON/OFF operation of the switch element SW or a voltage change caused by the modulated wave. For this reason, it is impossible to correctly determine the state of the switch element SW in which the aforementioned output voltage V becomes higher.

When a plurality of noncontact IC cards 6 are overlaid and the individual noncontact IC cards 6 start the detecting operation at any given point in time, the aforementioned output voltage V varies due to a change in the state (ON/OFF state of the switch element SW) of another noncontact IC card 6. For this reason, it is impossible to correctly determine the state of the switch element SW in which the aforementioned output voltage V becomes higher.

Under this circumstance, the noncontact IC card 6 of the present embodiment carries out the operation described below to correctly determine the state of the switch element SW in which the aforementioned output voltage V becomes higher.

When the ticket checker unit 3 is transmitting a polling command, the output voltage V of the power circuit 62 is at a low level because the electromagnetic wave transmitted from the ticket checker unit 3 is modulated. It is possible to detect the end of transmission of the aforementioned polling command by detecting a rising edge of the output voltage V.

The voltage change detector 73 serves to detect this rising edge of the output voltage V. The noncontact IC card 6 initiates the aforementioned detecting operation by reference to the detected rising edge of the output voltage V. This makes it possible to perform the detecting operation in a period other than when the electromagnetic wave transmitted from the ticket checker unit 3 is modulated and to synchronize execution of the detecting operation in each of the multiple noncontact IC cards 6 when they are overlaid. As a consequence, the noncontact IC card 6 can correctly determine the state of the switch element SW in which the aforementioned output voltage V becomes higher.

It is to be pointed out that the aforementioned detecting operation can be performed within a shorter period (e.g., 4 to 5 ms) than the polling command transmitting time interval (10 ms).

The rising edge of the output voltage V of the power circuit 62 at the end of transmission of the aforementioned polling command from the ticket checker unit 3 is relatively sharp. On the other hand, rising of the output voltage V of the power circuit 62 when the noncontact IC card 6 is brought close to the antenna section 5 of the ticket checker unit 3 is relatively slow. The voltage change detector 73 detects the relatively sharp rising edge of the aforementioned output voltage V as the end of transmission of the aforementioned polling command from the ticket checker unit 3, but the voltage change detector 73 does not detect the relatively slow rising of the output voltage V as the end of transmission of the aforementioned polling command.

In the noncontact IC card 6, the voltage change detector 73 detects the sharp rising edge of the output voltage V when the output voltage v of the aforementioned power circuit 62 is equal to or higher than the first threshold Vth1. The voltage change detector 73 detects this rising edge of the output voltage V. This condition is referred to as state 2 for the convenience of explanation. The state 2 is the condition in which the detecting operation is executed by turning on and off the switch element SW more than once at the fixed time intervals. The state 2 is also the condition in which the power supply switch element PSW is fixed to its OFF state.

The noncontact IC card 6 causes the switch element SW to turn on and off more than once at the fixed time intervals in the detecting operation. This is intended to enable a plurality of noncontact IC cards 6 become on and off almost simultaneously. If a judgment is made that the output voltage V of the power circuit 62 becomes higher when the switch element SW is on than when the switch element SW is off, the switch element SW is maintained in its ON state. This condition is referred to as state 3 for the convenience of explanation. The state 3 is the condition in which the switch element SW is on and the power supply switch element PSW is off. Contrary to this, if a judgment is made that the output voltage V of the power circuit 62 becomes higher when the switch element SW is off than when the switch element SW is on, the noncontact IC card 6 holds the switch element SW in its OFF state. This condition is referred to as state 4 for the convenience of explanation. The state 4 is the condition in which both the switch element SW and the power supply switch element PSW are in their OFF state. The capacitor C2 is electrically connected to the resonant circuit 60 when the switch element SW is on, and the capacitor C2 is electrically disconnected from the resonant circuit 60 when the switch element SW is off.

The switch control circuit 61 further controls the power supply switch element PSW in the following fashion.

When the second voltage comparator 72 detects that the aforementioned output voltage V has risen beyond the second threshold Vth2 (Vth2>Vth1) in the state 3 or 4, the noncontact IC card 6 causes the power supply switch element PSW to turn on. A condition in which the power supply switch element PSW has become ON from the state 3 is referred to as state 5 for the convenience of explanation. Also, a condition in which the power supply switch element PSW has become ON from the state 4 is referred to as state 6 for the convenience of explanation. The state 5 is the condition in which both the switch element SW and the power supply switch element PSW are in their ON state, while the state 6 is the condition in which switch element SW is in its OFF state and the power supply switch element PSW is in its ON state.

Whether the noncontact IC card 6 takes the state 5 or the state 6 depends on whether the state preceding the state 5 or the state 6 has been the state 3 or the state 4. The state 5 is a condition in which the two capacitors C1, C2 connected parallel to the antenna coil L are connected. The state 6 is a condition in which the capacitor C1 is connected but the capacitor C2 is not connected to the antenna coil L. While the resonant frequency of the resonant circuit 60 differs between the state 5 or the state 6, the output voltage V of the power circuit 62 rises beyond the specific threshold Vth2 and a voltage sufficient for operating the data processing section 66 is obtained in either of these states. Described below in detail are reasons why this situation is realized.

FIG. 7 is a diagram showing results of control operation performed by the switch control circuit 61 over the switch element SW and the power supply switch element PSW when the noncontact IC card 6 is brought close to the antenna section 5 of the ticket checker unit 3.

In the initial state, the switch element SW is in its OFF state, and the power supply switch element PSW is also in its OFF state. When the noncontact IC card 6 approaches the antenna section 5 in this initial state, an induced electromotive force occurs in the resonant circuit 60 of the noncontact IC card 6 and the output voltage V of the power circuit 62 rises. Then, when the aforementioned output voltage V becomes equal to or higher than the first threshold Vth1, the power circuit 62 stops to enter the reset signal (Reset-A) to the switch control circuit 61, causing the switch control circuit 61 to initiate its operation. When the first voltage comparator 71 of the switch control circuit 61 detects that the output voltage V has become equal to or higher than the specified threshold Vth1, the noncontact IC card 6 goes into the state 1.

When the voltage change detector 73 detects a relatively sharp rising edge of the output voltage V of the power circuit 62, or the voltage change detector 73 detects the end of transmission of the polling command from the ticket checker unit 3, while the noncontact IC card 6 is in the state 1, the noncontact IC card 6 goes into the state 2. In this state 2, the noncontact IC card 6 executes the detecting operation to determine the state of the switch element SW in which the output voltage V of the power circuit 62 becomes higher by turning on and off the switch element SW more than once.

As previously stated, the capacitances of the two capacitors C1, C2 are determined such that the resonant frequency of the resonant circuit 60 when the capacitor C2 is connected to the antenna coil L approximately matches the frequency of the electromagnetic waves transmitted from the ticket checker unit 3.

Figure 8:
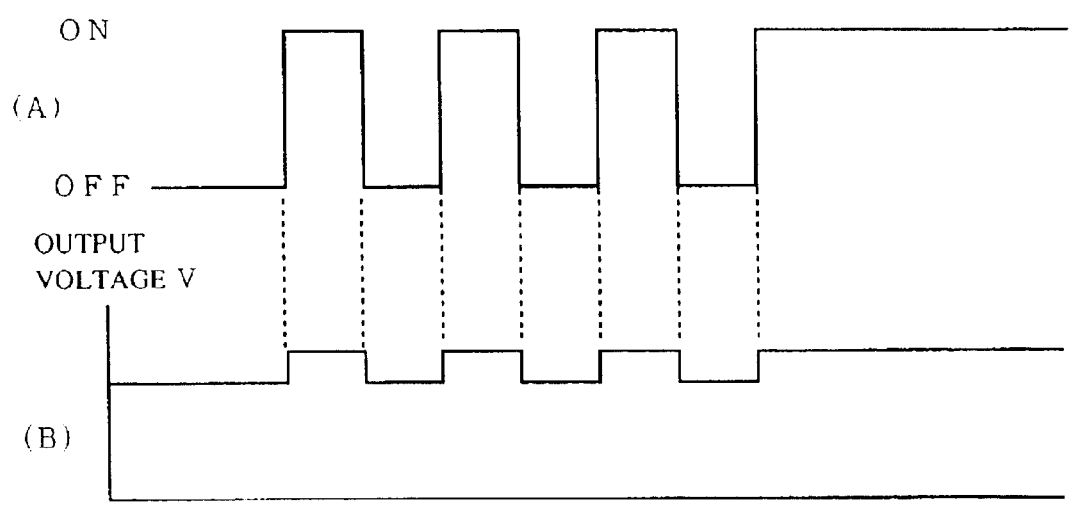
FIG. 8 is a diagram showing the state of the switch element in a single noncontact IC card and the output voltage of the power circuit of the noncontact IC card.

When the single noncontact IC card 6 is used, the output voltage V of the power circuit 62 becomes higher when the switch element SW is turned on and the capacitor C2 is connected to the antenna coil L in the above-described detecting operation (see FIG. 8). FIG. 8(A) shows ON/OFF states of the switch element SW and FIG. 8(B) shows the output voltage V of the power circuit 62. As a result, the noncontact IC card 6 goes into the state 3 in which the switch control circuit 61 holds the switch element SW in the ON state. At this point, the resonant frequency of the resonant circuit 60 approximately matches the frequency of the electromagnetic waves transmitted from the ticket checker unit 3.

Subsequently, the second voltage comparator 72 detects that the output voltage V of the power circuit 62 has risen to or beyond the second threshold Vth2, and the noncontact IC card 6 goes into the state 5 in which the power supply switch element PSW is in the ON state.

When the noncontact IC card 6 is brought close to the antenna section 5 of the ticket checker unit 3, the noncontact IC card 6 shifts from its initial state to the state 1, state 2, state 3 and state 5 in this order as seen above and becomes ready to perform noncontact data communication.

FIG. 9 is a diagram showing results of control operation performed by the switch control circuit 61 over the switch element SW and the power supply switch element PSW when two noncontact IC cards 6 overlaid with each other are brought close to the antenna section 5 of the ticket checker unit 3. The two noncontact IC cards 6 perform generally the same operation. The following explanation deals with the operation of one of these noncontact IC cards 6.

In the initial state, the switch element SW and the power supply switch element PSW are in their OFF state. When the stacked two noncontact IC cards 6 in the initial state are brought close to the antenna section 5, an induced electromotive force occurs in the resonant circuit 60 of each noncontact IC card 6 and the output voltage V of the power circuit 62 rises. Then, when the aforementioned output voltage V becomes equal to or higher than the first threshold Vth1, the power circuit 62 stops to enter the reset signal (Reset-A) to the switch control circuit 61, causing the switch control circuit 61 to initiate its operation. When the first voltage comparator 71 of the switch control circuit 61 detects that the output voltage V has become equal to or higher than the specified threshold Vth1, the noncontact IC card 6 goes into the state 1.

The two noncontact IC cards 6 go into the state 2 as each of the voltage change detectors 73 detects a rising edge of the output voltage V of the power circuit 62 at the same time. Then, each of the noncontact IC cards 6 executes the detecting operation to determine the state of the switch element SW in which the output voltage V of the power circuit 62 becomes higher by turning on and off the switch element SW. Thus, the detecting operation performed by the two noncontact IC cards 6 is synchronized.

In the two noncontact IC cards 6, the output voltage V rises to or beyond the first threshold Vth1due to the induced electromotive force occurring in the respective resonant circuits 60 almost simultaneously, or the output voltage V in one noncontact IC card 6 first rises to or beyond the first threshold Vth1and the output voltage V in the other noncontact IC card 6 rises to or beyond the first threshold Vth1.

In either case, the output voltage V of the power circuit 62 rises to or beyond the first threshold Vth1 in both of the two noncontact IC cards 6, and the voltage change detector 73 detects the rising edge of the output voltage V of the power circuit 62. The voltage change detectors 73 of the two noncontact IC cards 6 simultaneously detect the rising edge of the output voltage V of the respective power circuits 62. Consequently, the two noncontact IC cards 6 simultaneously go into the state 2 and initiate the detecting operation. The two noncontact IC cards 6 initiate the detecting operation by reference to the end of transmission of the polling command from the ticket checker unit 3 in this fashion. Therefore, it is possible to perform the detecting operation in a period other than when the electromagnetic wave received by the resonant circuit 60 is modulated and to synchronize the detecting operation executed by the two noncontact IC cards 6. Since the two noncontact IC cards 6 are preset to become on and off at fixed time intervals, they turn on and off the respective switch elements SW at the same timing.

As previously stated, the capacitance of the capacitor C1 is determined such that, when the two noncontact IC cards 6 in which the capacitor C2 is connected to the antenna coil L are overlaid with each other, the resonant frequency of the resonant circuit 60 of each noncontact IC card 6 approximately matches the frequency of the electromagnetic waves transmitted from the ticket checker unit 3 under the influence of mutual inductance between these noncontact IC cards 6.

Figure 10:
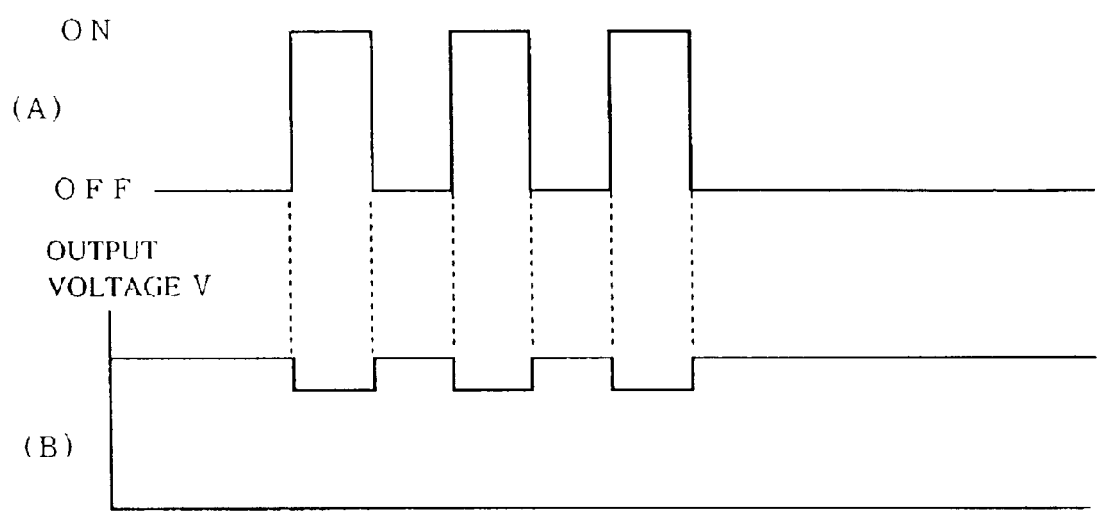
FIG. 10 is a diagram showing the state of the switch elements in two noncontact IC cards and the output voltage of the power circuits of the noncontact IC cards.

When two noncontact IC cards 6 are overlaid with each other, the output voltage V of the power circuit 62 becomes higher when the switch element SW is turned off and the capacitor C2 is disconnected from the antenna coil L (see FIG. 10). FIG. 10(A) shows ON/OFF states of the switch element SW and FIG. 10(B) shows the output voltage V of the power circuit 62. As a result, the two noncontact IC cards 6 together go into the state 4 in which the switch control circuit 61 holds the switch element SW in the OFF state.

At this point, although the two noncontact IC cards 6 are under the influence of the mutual inductance, the resonant frequency of the resonant circuit 60 and the frequency of the electromagnetic waves transmitted from the ticket checker unit 3 approximately match.

Subsequently, the second voltage comparator 72 detects that the output voltage V of the power circuit 62 has risen to or beyond the second threshold Vth2, and the two noncontact IC cards 6 go into the state 6 in which the power supply switch element PSW is in the ON state.

Due to the above-described operation of the switch control circuit 61, the two noncontact IC cards 6 can supply sufficient electric power to their data processing sections 66 even when the two noncontact IC cards 6 overlaid with each other are brought close to the antenna section 5 of the ticket checker unit 3. Therefore, both of the noncontact IC cards 6 become ready to perform noncontact data communication.

Even when three or more noncontact IC cards 6 are overlaid, each noncontact IC card 6 follows one of the aforementioned state transition flows. More specifically, when three or more overlaid noncontact IC cards 6 are used, each noncontact IC card 6 performs the detecting operation to determine the state (ON or OFF) of the switch element SW in which the output voltage of the power circuit 62 becomes higher, and holds the switch element SW in that state.

Next, transition of the state of the noncontact IC card 6 is described in detail referring to FIG. 11. FIG. 11(A) shows the state transition flow of the noncontact IC card 6 and FIG. 11(B) shows ON/OFF states of the switch element SW and the power supply switch element PSW in each state. In the initial state, both the switch element SW and the power supply switch element PSW are in their OFF state. When the noncontact IC card 6 is brought close to the antenna section 5 of the ticket checker unit 3, the output voltage V of the power circuit 62 rises. When the output voltage V rises to or beyond the first threshold Vth1, the noncontact IC card 6 goes into the state 1. Both the switch element SW and the power supply switch element PSW are in their OFF state in this state 1 as well.

When the noncontact IC card 6 detects the end of transmission of the polling command from the ticket checker unit 3 in this state 1, the noncontact IC card 6 goes into the state 2 and initiates the detecting operation. In this detecting operation, the noncontact IC card 6 determines the state of the switch element SW in which the output voltage V of the power circuit 62 becomes higher by turning on and off the switch element SW more than once. More specifically, the noncontact IC card 6 determines the state of the switch element SW in which the difference between the resonant frequency of the resonant circuit 60 and the frequency of the electromagnetic waves transmitted from the ticket checker unit 3 becomes small.

If a judgment is made that the output voltage becomes higher when the switch element SW is on than when the switch element SW is off in the aforementioned detecting operation, the noncontact IC card 6 goes into the state 3 in which the switch element SW is held in the ON state. Subsequently, the noncontact IC card 6 waits until the output voltage V rises to or beyond the second threshold Vth2 and goes into the state 5. In this state 5, the switch control circuit 61 holds the switch element SW and the power supply switch element PSW in their ON state. At this point, the noncontact IC card 6 supplies sufficient electric power to its data processing section 66 and can perform noncontact communication with the ticket checker unit 3.

Upon completion of noncontact communication with the ticket checker unit 3 in the state 5, the noncontact IC card 6 returns to the initial state. The noncontact IC card 6 also returns to the initial state when it is separated from the antenna section 5 and the output voltage V of the power circuit 62 drops to less than the first threshold Vth1.

Conversely, if a judgment is made that the aforementioned output voltage V becomes higher when the switch element SW is off in the foregoing detecting operation, the noncontact IC card 6 goes into the state 4 in which the switch element SW is held in the OFF state. Subsequently, the noncontact IC card 6 waits until the output voltage V rises to or beyond the second threshold Vth2 and goes into the state 6. In this state 6, the switch control circuit 61 holds the switch element SW in the OFF state and the power supply switch element PSW in the ON state. At this point, the noncontact IC card 6 supplies sufficient electric power to its data processing section 66 and can perform noncontact communication with the ticket checker unit 3.

Upon completion of noncontact communication with the ticket checker unit 3 in the state 6, the noncontact IC card 6 returns to the initial state. The noncontact IC card 6 also returns to the initial state when it is separated from the antenna section 5 and the output voltage V of the power circuit 62 drops to less than the first threshold Vth1.

The noncontact IC card 6 also returns to the initial state if the output voltage V of the power circuit 62 drops to less than the first threshold Vth1 when the noncontact IC card 6 is in the state 3 or state 4. When the noncontact IC card 6 returns from the state 3 to the initial state, the switch element SW is turned off.

While the aforementioned power supply switch element PSW need not necessarily be provided in the foregoing configuration, the electric power is always supplied from the power circuit 62 to the data processing section 66 if the power supply switch element PSW is not provided.

In contrast, if the power supply switch element PSW is provided, it is possible to interrupt the power supply to the data processing section 66 by turning off the power supply switch element PSW and thereby reduce power consumption of the noncontact IC card 6. Normally, the data processing section 66 consumes greater electric power than the switch control circuit 61. Therefore, by interrupting the power supply to the data processing section 66, it is possible to operate the switch control circuit 61 with weaker electromagnetic waves than when the power supply to the data processing section 66 is not interrupted. Furthermore, by turning on the power supply switch element PSW after the output voltage V of the power circuit 62 has risen to or beyond the second threshold Vth2 at which the data processing section 66 can be operated in a stable fashion, it is possible to prevent malfunction of the data processing section 66 due to insufficient power supply.

In addition, it is possible to determine the state of the switch element SW controlled by the switch control circuit 61 before the noncontact IC card 6 is brought to a distance at which sufficient power supply for operating its main circuit can be supplied. With this arrangement, electric power is supplied to the main circuit, causing it to operate, when the noncontact IC card 6 has been brought to that distance.

Figure 12:
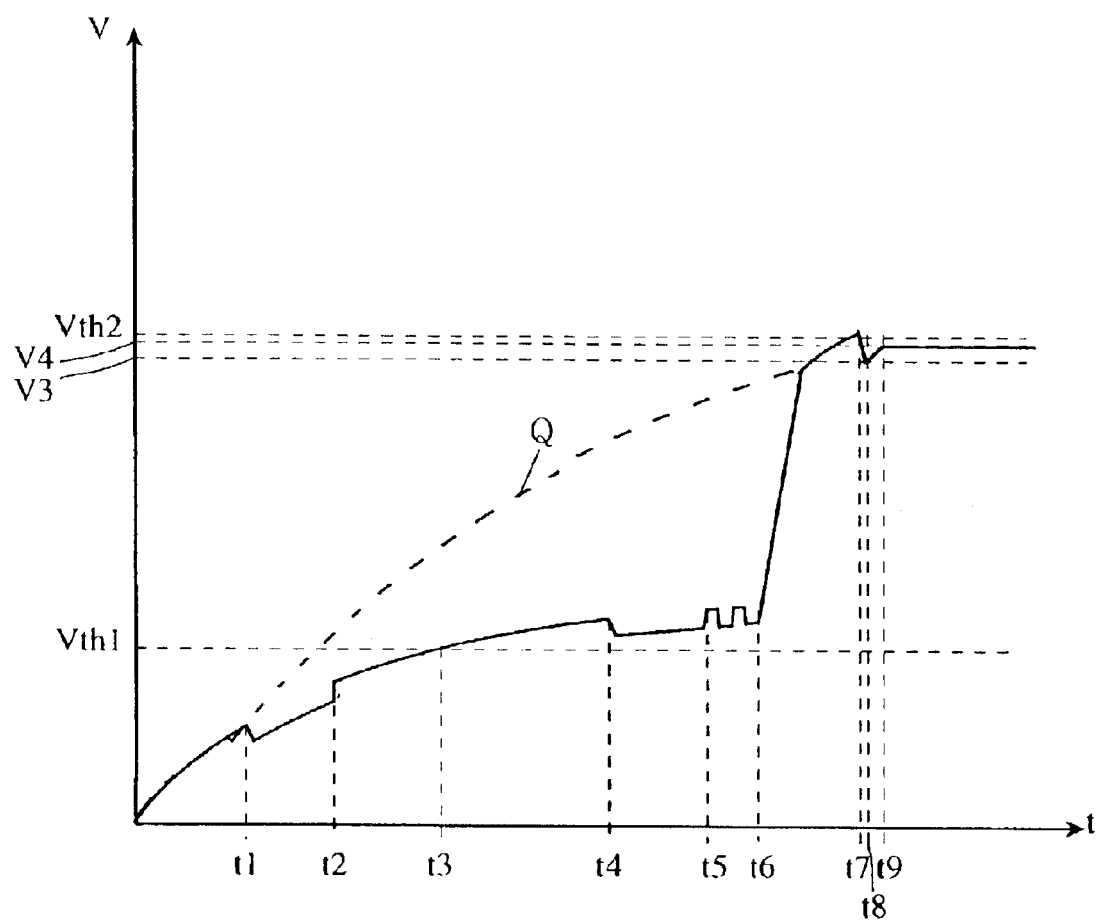
FIG. 12 is a diagram showing variations in the output voltage of each card when the single noncontact IC card is used.
Figure 13:
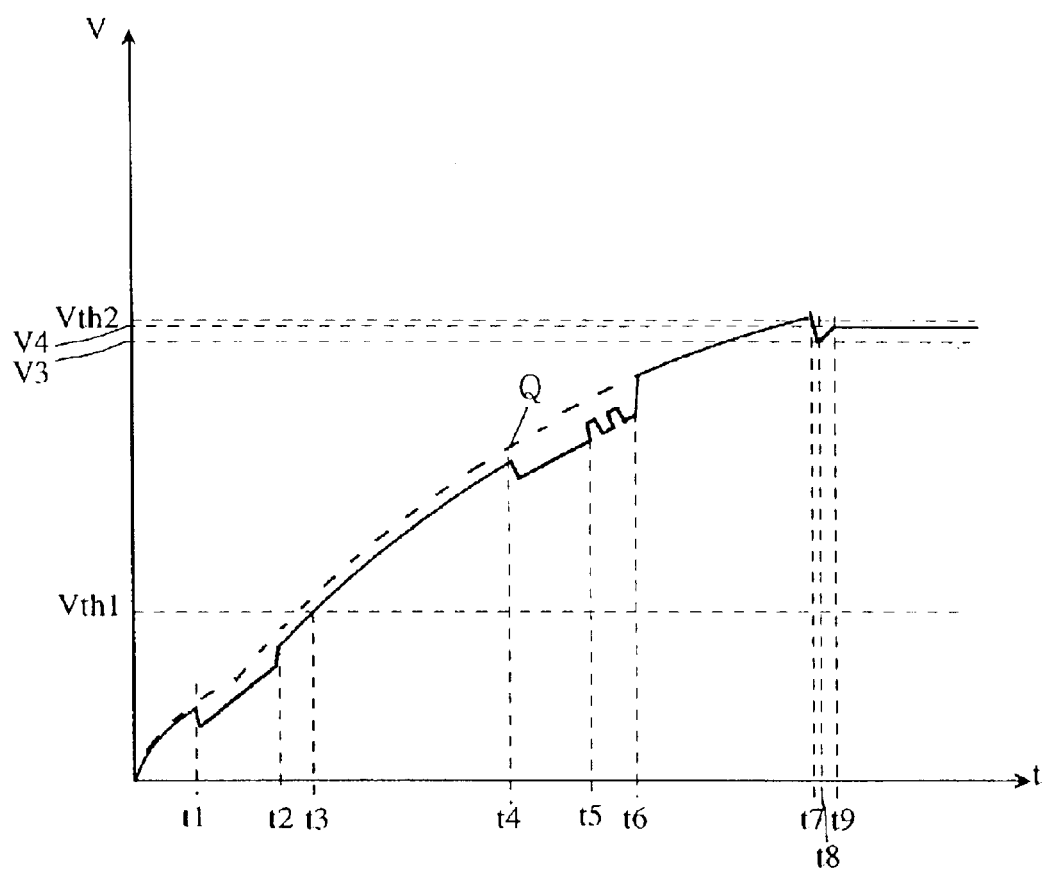
FIG. 13 is a diagram showing variations in the output voltage of each card when two noncontact IC cards are used together.

Referring next to FIGS. 12 and 13, time-sequential transition of the output voltage V of the power circuit 62 that occurs when the noncontact IC card 6 is brought close to the antenna section 5 of the information read/write device 4 is described in detail.

FIG. 12 is a diagram showing time-sequential transition of the output voltage V of the power circuit 62 that occurs in one noncontact IC card 6 when the noncontact IC card 6 is brought close to the antenna section 5 of the information read/write device 4. Should the noncontact IC card 6 detect the end of transmission of a polling command (at time t5 shown in the Figure) when the output voltage V of the power circuit 62 is equal to or higher than the first threshold Vth1(at time t3 or later shown in the Figure), the noncontact IC card 6 initiates the detecting operation. The period between times t1 and t2 and the period between times t4 and t5 are polling command transmitting periods. Based on results of the detecting operation thus initiated, the switch element SW is held in the ON state at time t6. Since the resonant frequency of the resonant circuit 60 approximately matches the frequency of the electromagnetic wave transmitted from the ticket checker unit 3 as a consequence, the output voltage V of the power circuit 62 sharply rises. The output voltage V then continues to rise further. When the aforementioned output voltage reaches the second threshold Vth2 (time t7), the noncontact IC card 6 turns on the power supply switch element PSW. As a result, the noncontact IC card 6 begins to supply electric power to its main circuit and power consumption of the noncontact IC card 6 increases, so that the output voltage V rapidly drops down to voltage V3 (time t8). Then, the output voltage V rises up to a saturation voltage V4 (time t9) and, subsequently, the output voltage becomes constant. A reason why the output voltage V sharply rises at time t6 is that the output voltage V instantly rises up to a voltage which should have been reached along a voltage-rising curve Q if the resonant circuit had been in a state of resonance from the beginning. Further, the output voltage rapidly drops down to the voltage V3 immediately after the power supply switch element PSW has becomes on. The second threshold Vth2 is set such that this output voltage V3 would become equal to or higher than a voltage necessary for operating the data processing section 66 which is the main circuit of the noncontact IC card 6.

FIG. 13 is a diagram showing time-sequential transition of the output voltage V of the power circuit 62 that occurs in each noncontact IC card 6 when two noncontact IC cards 6 are brought close to the antenna section 5 of the information read/write device 4. Should any one of the noncontact IC cards 6 detect the end of transmission of a polling command (at time t5 shown in the Figure) when the output voltage V is equal to or higher than the first threshold Vth1 (at time t3 or later shown in the Figure), the noncontact IC card 6 initiates the detecting operation. Based on results of this detecting operation, the switch element SW is held in the OFF state at time t6. As a consequence, the resonant frequency of the resonant circuit 60 which is affected by mutual inductance approximately matches the frequency of the electromagnetic wave transmitted from the ticket checker unit 3 in each noncontact IC card 6. Then, when the aforementioned output voltage reaches the second threshold Vth2 (time t7), the noncontact IC card 6 turns on the power supply switch element PSW. As a result, the noncontact IC card 6 begins to supply electric power to its main circuit and power consumption of the noncontact IC card 6 increases, so that the output voltage V rapidly drops down to voltage V3 (time t8). Then, the output voltage V rises up to a saturation voltage V4 (time t9) and, subsequently, the output voltage becomes constant. A reason why the output voltage V of the power circuit 62 does not sharply rise at time t6 is that the output voltage V has risen along a voltage-rising curve Q since the switch element SW is in the OFF state in the initial state of the noncontact IC card 6.

Figure 14:
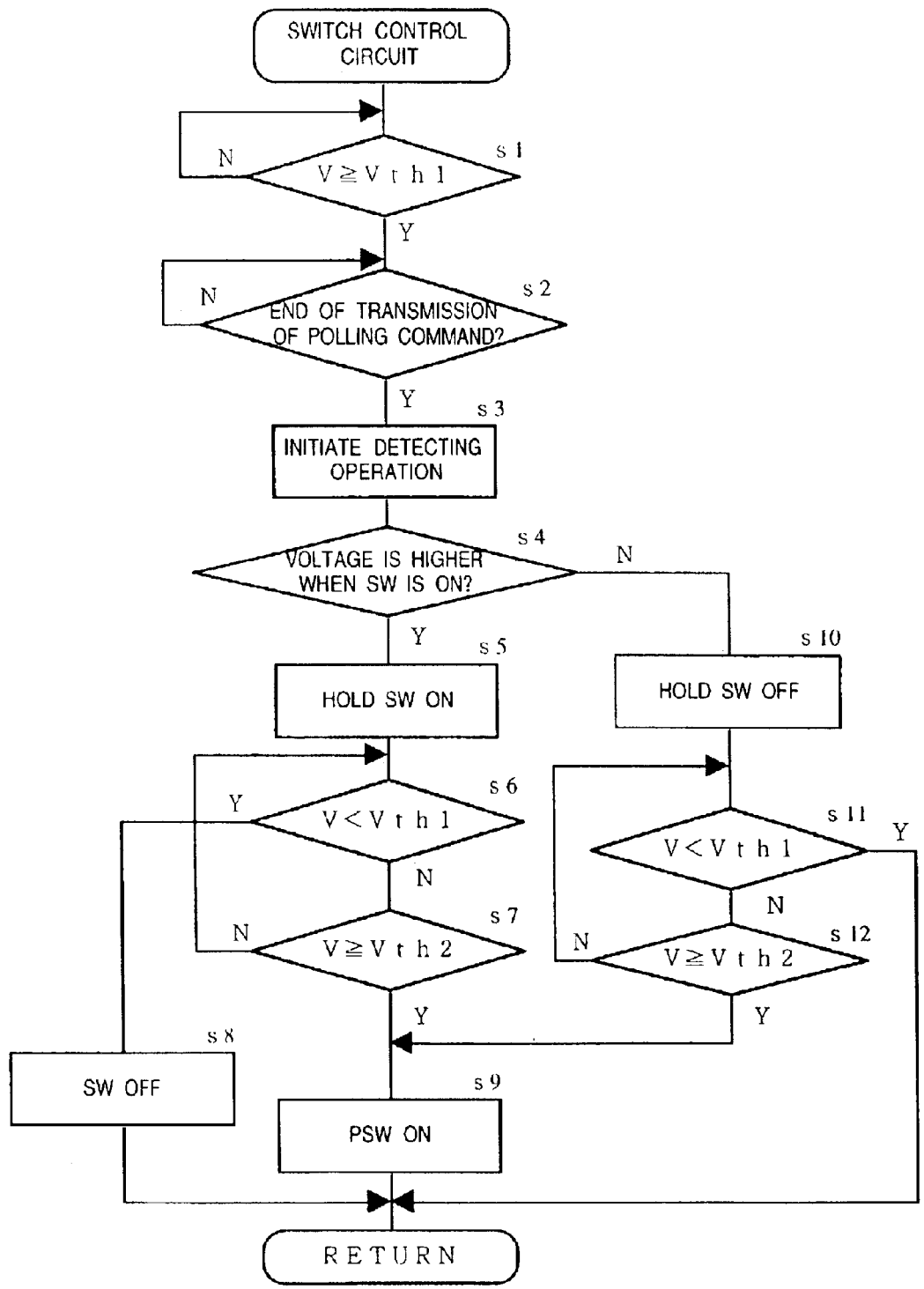
FIG. 14 is a flowchart showing the operation of the switch control circuit.

FIG. 14 is a flowchart showing the operation of the switch control circuit 61.

At s1, a judgment is made to determine whether the output voltage V of the power circuit 62 is equal to or higher than the first threshold Vth1. If the output voltage V is equal to or higher than the first threshold Vth1, the end of transmission of a polling command is detected at s2. When the end of transmission of the polling command has been detected (s3), the switch element SW is turned on and off more than once, and a judgment is made to determine the state of the switch element SW in which the output voltage V of the power circuit 62 becomes higher (s4). If the output voltage V of the power circuit 62 is higher when the switch element SW is on, the switch element SW is held in the OFF state (s5), and the noncontact IC card 6 waits until the output voltage V becomes equal to or higher than the first threshold Vth1 (s6) or equal to or higher than the second threshold Vth2 (s7). When the output voltage V becomes lower than the first threshold Vth1, the switch element SW is returned to OFF at s8 (s8) and the current operation is finished. As a result, the noncontact IC card 6 returns to the initial state.

When the output voltage V becomes equal to or higher than the second threshold Vth2, the power supply switch element PSW is turned on (s9).

If the output voltage V of the power circuit 62 is higher when the switch element SW is turned off at s4, the switch element SW is held in the OFF state (s10), and the noncontact IC card 6 waits until the output voltage V becomes lower than the first threshold Vth1 (s11) or equal to or higher than the second threshold Vth2 (s12). When the output voltage V becomes lower than the first threshold Vth1, the current operation is finished. As a result, the noncontact IC card 6 returns to the initial state.

When the output voltage V becomes equal to or higher than the second threshold Vth2, the power supply switch element PSW is turned on (s9).

The noncontact IC card 6 returns to the initial state when noncontact communication with the ticket checker unit 3 is completed after the power supply switch element PSW has been turned on at s9. The noncontact IC card 6 also returns to the initial state when it is separated from the antenna section 5 and the output voltage V of the power circuit 62 drops to less than the first threshold Vth1.

In the above-described embodiment, the capacitance of the capacitor C1 is determined such that, when two noncontact IC cards 6 are overlaid with each other, with the capacitor C2 of each noncontact IC card 6 disconnected from the antenna coil L, the resonant frequency of the resonant circuit 60 of each noncontact IC card 6 approximately matches the frequency of the electromagnetic waves transmitted from the ticket checker unit 3 under the influence of mutual inductance between these noncontact IC cards 6. This may be modified as described below.

Specifically, the capacitance of the capacitor C1 may be such that, when two noncontact IC cards 6 are overlaid with each other, with the capacitor C2 of each noncontact IC card 6 disconnected from the antenna coil L, the resonant frequency of the resonant circuit 60 of each noncontact IC card 6 is slightly higher than the frequency of the electromagnetic waves transmitted from the ticket checker unit 3 under the influence of mutual inductance between these noncontact IC cards 6.

It is to be pointed out, however, that the capacitances of the two capacitors C1, C2 are determined such that, when the single noncontact IC card 6 is used, the resonant frequency of the resonant circuit 60 when the capacitor C2 is connected to the antenna coil L approximately matches the frequency of the electromagnetic waves transmitted from the ticket checker unit 3.

The resonant frequency of the resonant circuit 60 becomes lower when three noncontact IC cards 6 are overlaid than when two noncontact IC cards 6 are overlaid. If the capacitances of the capacitors C1, C2 are determined as stated above and two noncontact IC cards 6 are overlaid, or three noncontact IC cards 6 are overlaid, the resonant frequency of the resonant circuit 60 of each noncontact IC card 6 does not greatly deviate from the frequency of the electromagnetic waves transmitted from the ticket checker unit 3 when the earlier-mentioned first capacitor C2 is in the disconnected state. For this reason, either when two noncontact IC cards 6 are overlaid, or when three noncontact IC cards 6 are overlaid, it is possible to avoid a decrease in the output voltage of the resonant circuit 60 of each noncontact IC card 6. Therefore, the individual noncontact IC cards 6 can carry out stable noncontact communication with the ticket checker unit 3.

Since the capacitances of the two capacitors C1, C2 are determined such that, when the single noncontact IC card 6 is used, the resonant frequency of the resonant circuit 60 when the capacitor C2 is connected to the antenna coil L approximately matches the frequency of the electromagnetic waves transmitted from the ticket checker unit 3, the communication range does not decrease when the single noncontact IC card 6 is used.

Figure 15:
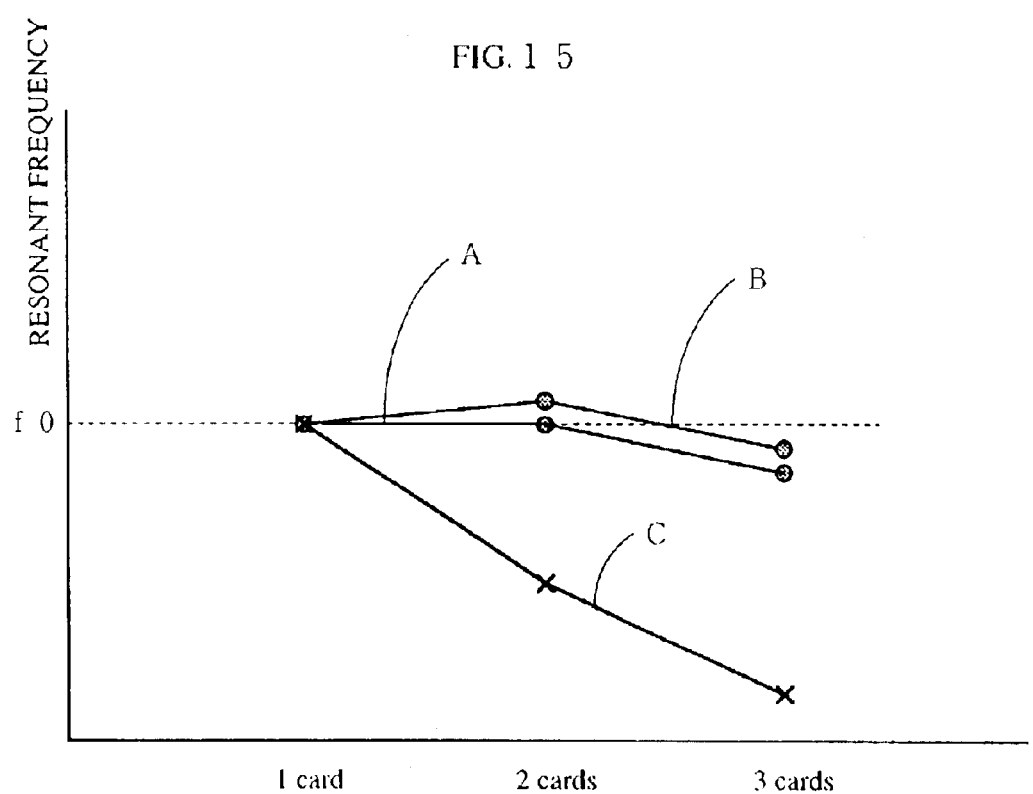
FIG. 15 is a diagram showing results of comparison between the noncontact IC card of the present embodiment and a conventional noncontact IC card.

Results of comparison between the noncontact IC card 6 of the present embodiment and a conventional noncontact IC card are shown in FIG. 15. Indicated by "A" is the result obtained when the resonant frequency is approximately matched to the frequency of the electromagnetic waves transmitted from the ticket checker unit 3 when two noncontact IC cards 6 whose switch elements SW are in the OFF state are overlaid with each other, and indicated by "B" is the result obtained when the resonant frequency is slightly increased. Further, indicated by "C" is the result obtained with the conventional noncontact IC card. As shown in FIG. 15, when a plurality of conventional noncontact IC cards are overlaid, the resonant frequency greatly decreases and, therefore, the noncontact IC cards can not communicate with the ticket checker unit 3 in a stable fashion when they are overlaid with one another. Contrary to this, the noncontact IC cards 6 of this embodiment make it possible to avoid a drop of the resonant frequency by controlling ON/OFF actions of the switch element SW. Therefore, it is possible to perform noncontact communication with the ticket checker unit 3 even in a state where a plurality of noncontact IC cards 6 are overlaid with one another.

Described next is a method by which the noncontact IC card 6 and the information read/write device 4 of the ticket checker unit 3 perform communication.

First, a method by which the information read/write device 4 of the ticket checker unit 3 communicates with one noncontact IC card 6 after another existing in the communicability area is explained below. Here, the method is described using an example in which two noncontact IC cards 6 are present within the communicability area.

The information read/write device 4 transmits a polling command at specific time intervals until a response to the polling command is received.

When any noncontact IC card 6 existing within the communicability area receives this polling command, the noncontact IC card 6 transmits a response containing its own identification information back to the information read/write device 4.

If a plurality of noncontact IC cards 6 exist within the same communicability area, such as when two or more noncontact IC cards 6 are overlaid, these noncontact IC cards 6 synchronize in operation. Therefore, responses to the polling command returned to the information read/write device 4 interfere with one another. In this circumstance, an anticollision treatment as described below, for example, is performed.

First, if the information read/write device 4 judges that the responses returned from the multiple noncontact IC cards 6 after polling are interfering with one another (data can not be correctly received), the information read/write device 4 reexecutes polling operation. The polling command transmitted in this reexecuted polling operation is a different command from the polling command transmitted in the first polling operation. Here, for the convenience of explanation, the first polling command is referred to as the polling command A and the second polling command is referred to as the polling command B.

The multiple noncontact IC cards 6 which have received the polling command B individually return their responses to the information read/write device 4 with random time delays. This makes it possible to avoid interference of the responses from the individual noncontact IC cards 6.

If interference occurs even when the responses are returned with random time delays, the information read/write device 4 retransmits the polling command B, causing the noncontact IC cards 6 to randomly respond again. The information read/write device 4 repeatedly transmits the polling command B until the responses from the noncontact IC cards 6 do not interfere with one another. With this arrangement, the information read/write device 4 can receive interference-free responses from the individual noncontact IC cards 6.

Let us now consider a case where one of two noncontact IC cards 6 transmits a response at an earlier time.

The information read/write device 4 receives the response from one noncontact IC card 6 (hereinafter referred to as the first noncontact IC card 6) at first. The information read/write device 4 then disregards the response transmitted subsequently from the other noncontact IC card 6 (hereinafter referred to as the second noncontact IC card 6). The information read/write device 4 determines from which noncontact IC card 6 the response has been received based on the identification information of the received response. To begin noncontact communication with the first noncontact IC card 6 from which the response has been received, the information read/write device 4 transmits a command for establishing communication to the first noncontact IC card 6. This communication-establishing command contains identification information of the first noncontact IC card 6.

Upon receiving this communication-establishing command, the first noncontact IC card 6 transmits a response to the communication-establishing command back to the information read/write device 4.

When the response to the communication-establishing command is received, the information read/write device 4 transmits a read command, etc. to the first noncontact IC card 6. The first noncontact IC card 6 then transmits a response corresponding to the received command back to the information read/write device 4. Noncontact communication between the information read/write device 4 and the first noncontact IC card 6 is carried out in this manner.

When the noncontact communication with the first noncontact IC card 6 is finished, the information read/write device 4 retransmits the polling command. Since the noncontact communication is finished at this point, the first noncontact IC card 6 does not transmit any response to this polling command. The second noncontact IC card 6, which has not finished the noncontact communication transmits the response to this polling command.

Upon receiving this response, the information read/write device 4 transmits a communication-establishing command to the second noncontact IC card 6.

When the communication-establishing command is received, the second noncontact IC card 6 transmits a response to this communication-establishing command back to the information read/write device 4.

When the response to this communication-establishing command is received, the information read/write device 4 transmits a read command, etc. to the second noncontact IC card 6. The second noncontact IC card 6 transmits a response corresponding to the received command back to the information read/write device 4. Noncontact communication between the information read/write device 4 and the second noncontact IC card 6 is carried out in this way.

The information read/write device 4 transmits the polling command at specific times and performs noncontact communication with the noncontact IC card 6 which has returned the response to the communication-establishing command in the aforementioned manner.

Described next is another method by which the information read/write device 4 communicates with a plurality of noncontact IC cards 6 existing in the communicability area. Here again, the method is described using an example in which two noncontact IC cards 6 are present within the communicability area.

The information read/write device 4 transmits the polling command at specific time intervals until the response to the polling command is received.

When any noncontact IC card 6 existing within the communicability area receives this polling command, the noncontact IC card 6 transmits a response containing its own identification information back to the information read/write device 4. If interference occurs here, the anticollision treatment is performed. Let us now consider a case where one of two noncontact IC cards 6 transmits a response at an earlier time.

The information read/write device 4 receives the response from one noncontact IC card 6 (hereinafter referred to as the first noncontact IC card 6) at first. Subsequently, the information read/write device 4 receives the response from the other noncontact IC card 6 (hereinafter referred to as the second noncontact IC card 6).

The information read/write device 4 which has received the responses from the two noncontact IC cards 6 retransmits the polling command to judge whether there exists any other noncontact IC card 6 within the communicability area with which communication can be made. If the information read/write device 4 judges that no response is received from other noncontact IC card 6, the information read/write device 4 performs an operation for carrying out noncontact communication with the two noncontact IC cards 6.

The information read/write device 4 determines from which noncontact IC card 6 each response has been received based on the identification information of the received response. The information read/write device 4 transmits a command for establishing communication to each noncontact IC card 6. Upon receiving this communication-establishing command, the first noncontact IC card 6 transmits a response to the communication-establishing command back to the information read/write device 4. Upon receiving the communication-establishing command, the second noncontact IC card 6 also transmits a response to the communication-establishing command back to the information read/write device 4.

Upon receiving the responses to the communication-establishing commands from the individual noncontact IC cards 6, the information read/write device 4 transmits a read command, etc. to the first noncontact IC card 6. The first noncontact IC card 6 then transmits a response corresponding to the received command back to the information read/write device 4. Noncontact communication between the information read/write device 4 and the first noncontact IC card 6 is carried out in this manner.

When the noncontact communication with the first noncontact IC card 6 is finished, the information read/write device 4 transmits a read command, etc. to the second noncontact IC card 6. The second noncontact IC card 6 transmits a response corresponding to the received command back to the information read/write device 4. Noncontact communication between the information read/write device 4 and the second noncontact IC card 6 is carried out in this way.

When the noncontact communication with the second noncontact IC card 6 is finished, the information read/write device 4 transmits the polling command.

The information read/write device 4 repeatedly transmits the polling command at specific time intervals until the response to the polling command is received.

Next, another embodiment of the invention is described. While the noncontact IC card 6 of the foregoing embodiment initiates the aforementioned detecting operation by reference to the timing of detecting the end of transmission of the polling command from the information read/write device 4, this may be modified as described below.

Figure 16:
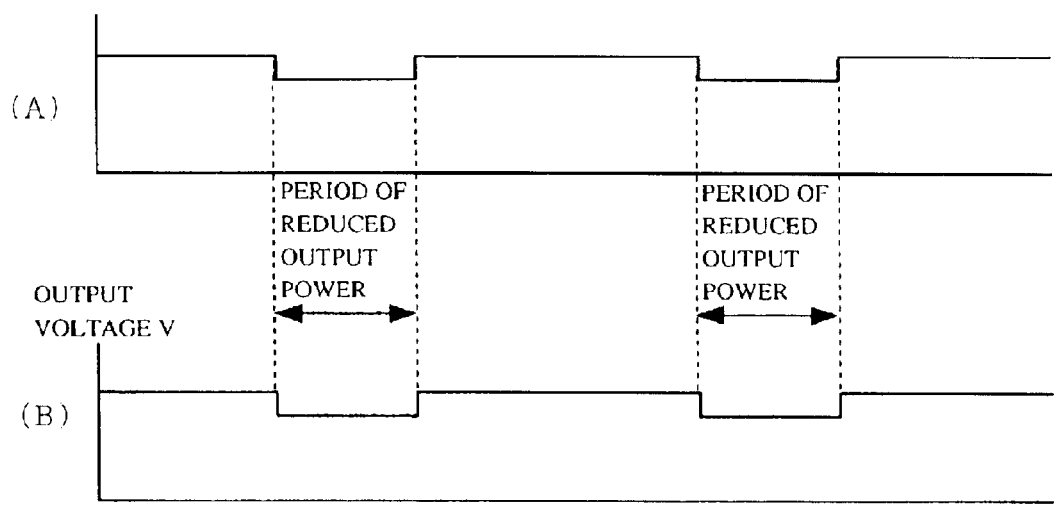
FIG. 16 is a diagram showing electromagnetic waves output from a ticket checker unit according to another embodiment of the invention and output voltage of a noncontact IC card.

Instead of transmitting the polling command, an information read/write device 4 reduces electromagnetic wave output power for a specific time period at specific time intervals (e.g., every 20 ms) as shown in FIG. 16(A). In addition, electromagnetic waves transmitted from the information read/write device 4 are not modulated except when it is communicating with a noncontact IC card 6.

Therefore, output voltage V of a power circuit 62 drops for a specific time period at specific time intervals (e.g., every 10 ms) as shown in FIG. 16(B). The fixed time period during which the information read/write device 4 decreases the electromagnetic wave output power is a period (e.g., 2 ms) which is sufficient for executing the aforementioned detecting operation.

The noncontact IC card 6 of this embodiment may detect a rising edge of the output voltage V and perform the aforementioned detecting operation by reference to the detected rising edge of the output voltage V. Alternatively, the noncontact IC card 6 may detect a falling edge of the output voltage V and perform the aforementioned detecting operation by reference to the detected falling edge of the output voltage V. In either case, the noncontact IC card 6 produces the same effects as the noncontact IC card 6 of the foregoing embodiment.

The detecting operation performed by the noncontact IC card 6 of this embodiment is the same as that performed by the noncontact IC card 6 of the foregoing embodiment, except that the timing of executing the detecting operation differs.

As the information read/write device 4 does not transmit the polling command in this embodiment, the noncontact IC card 6 and the information read/write device 4 communicate with each other by transmitting a communication request command requesting communication from the information read/write device 4 existing within the communicability area to the information read/write device 4. A specific communicability method is described below. Here, the method is described using an example in which two noncontact IC cards 6 are present within the communicability area.

The two noncontact IC cards 6 existing within the communicability area individually transmit communication request commands requesting communication to the information read/write device 4. These communication request commands contain identification information which identifies the respective noncontact IC cards 6. Let us now consider a case where one of the two noncontact IC cards 6 transmits the communication request command at an earlier time.

When the information read/write device 4 receives the communication request command from one noncontact IC card 6 (hereinafter referred to as the first noncontact IC card 6) existing within the communicability area, the information read/write device 4 determines from which noncontact IC card 6 the communication request command has been received. To begin noncontact communication with the first noncontact IC card 6 from which the communication request command has been received, the information read/write device 4 transmits a command for establishing communication to the first noncontact IC card 6. This communication-establishing command contains the identification information of the first noncontact IC card 6.

Upon receiving this communication-establishing command, the first noncontact IC card 6 transmits a response to the communication-establishing command back to the information read/write device 4.

When the response to the communication-establishing command is received from the first noncontact IC card 6, the information read/write device 4 transmits a read command, etc. to the first noncontact IC card 6. The first noncontact IC card 6 then transmits a response corresponding to the received command back to the information read/write device 4. Noncontact communication between the information read/write device 4 and the first noncontact IC card 6 is carried out in this manner.

When the noncontact communication with the noncontact IC card 6 which has transmitted the communication request command is finished, the information read/write device 4 waits for a communication request command to be transmitted from the second noncontact IC card 6 while carrying out the operation to reduce the electromagnetic wave output power for a specific time period at the specific time intervals. When the communication request command is received from the second noncontact IC card 6, the information read/write device 4 transmits a command for establishing communication to the second noncontact IC card 6 to begin noncontact communication with the second noncontact IC card 6. This communication-establishing command contains the identification information of the second noncontact IC card 6.

Upon receiving this communication-establishing command, the second noncontact IC card 6 transmits a response to the communication-establishing command to the information read/write device 4.

When the response to the communication-establishing command is received from the second noncontact IC card 6, the information read/write device 4 transmits a read command, etc. to the second noncontact IC card 6. The second noncontact IC card 6 then transmits a response corresponding to the received command back to the information read/write device 4. Noncontact communication between the information read/write device 4 and the second noncontact IC card 6 is carried out in this manner.

Communication between the information read/write device 4 and the noncontact IC card 6 may be carried out by the following method as well. Here again, the method is described using an example in which two noncontact IC cards 6 are present within the communicability area.

When a plurality (two in this example) of noncontact IC cards 6 exist within the communicability area, both noncontact IC cards 6 transmit communication request commands requesting communication to the noncontact IC card 6. These communication request commands contain identification information which identifies the respective noncontact IC cards 6. Let us now consider a case where one of the two noncontact IC cards 6 transmits the communication request command at an earlier time.

When the information read/write device 4 receives the communication request command from one noncontact IC card 6 (hereinafter referred to as the first noncontact IC card 6), the information read/write device 4 waits until the communication request command from the other noncontact IC card 6 (hereinafter referred to as the second noncontact IC card 6) for a preset time period. Here, the information read/write device 4 receives the communication request command from the second noncontact IC card 6. The information read/write device 4 transmits communication-establishing commands to the individual noncontact IC cards 6. Upon receiving the communication-establishing command, the first noncontact IC card 6 transmits a response to the command back to the information read/write device 4. Upon receiving the communication-establishing command, the second noncontact IC card 6 also transmits a response to the command back to the information read/write device 4.

Upon receiving the responses to the communication-establishing commands from the individual noncontact IC cards 6, the information read/write device 4 transmits a read command, etc. to the first noncontact IC card 6. The first noncontact IC card 6 then transmits a response corresponding to the received command back to the information read/write device 4. Noncontact communication between the information read/write device 4 and the first noncontact IC card 6 is carried out in this manner.

When the noncontact communication with the first noncontact IC card 6 is finished, the information read/write device 4 transmits a read command, etc. to the second noncontact IC card 6. The second noncontact IC card 6 transmits a response corresponding to the received command back to the information read/write device 4. Noncontact communication between the information read/write device 4 and the second noncontact IC card 6 is carried out in this way.

When the noncontact communication with the two noncontact IC cards 6 which have transmitted the communication request commands is finished, the information read/write device 4 waits for a communication request command to be transmitted from another noncontact IC card 6 while carrying out the operation to reduce the electromagnetic wave output power for a specific time period at the specific time intervals (e.g., every 20 ms).

As thus far described, even when a plurality of noncontact communications media (e.g., noncontact IC cards) held close to each other (overlapped state) are simultaneously brought close to a communications apparatus, such as an information read/write device, it is possible to carry out noncontact communication with the individual media according to the present invention.

INDUSTRIAL APPLICABILITY

This invention applied to such equipment as identification equipment, a personal authentication apparatus, an automatic ticket checker, an automated teller machine for handling cash or electronic cash, and a charge collecting machine.

What is claimed is:

1. A noncontact communications medium comprising:
   a resonant circuit including:
      an antenna coil which generates an induced electromotive force by receiving electromagnetic waves carrying information as a result of changes in the amount of electric power and thereby transmits and receives signals;
      two capacitors parallel-connected to the antenna coil;
   a main circuit which processes a received signal obtained by demodulating an output of said resonant circuit and outputs a modulated transmitting signal to said resonant circuit;
   a switch section which switches first one of said two capacitors between a connected state and a disconnected state; and
   a switch control section which controls switching operation of said switch section according to the amount of an output voltage occurring in said resonant circuit and according to a specific change in said output voltage, wherein said switch control section controls the switching operation of said switch section according to a change in a rising edge of said output voltage when the output voltage occurring in said resonant circuit is equal to or higher than a specific value.

2. A noncontact communications medium comprising:
   a resonant circuit including:
      an antenna coil which generates an induced electromotive force by receiving electromagnetic waves carrying information as a result of changes in the amount of electric power and thereby transmits and receives signals; and
      two capacitors parallel-connected to the antenna coil;
   a main circuit which processes a received signal obtained by demodulating an output of said resonant circuit and outputs a modulated transmitting signal to said resonant circuit;
   a switch section which switches first one of said two capacitors between a connected state and a disconnected state; and
   a switch control section which controls switching operation of said switch section according to the amount of an output voltage occurring in said resonant circuit and according to a specific change in said output voltage, wherein said switch control section controls the switching operation of said switch section according to a change in a falling edge of said output voltage when the output voltage occurring in said resonant circuit is equal to or higher than a specific value.

3. A noncontact communications medium comprising:
   a resonant circuit including:
      an antenna coil which generates art induced electromotive force by receiving electromagnetic waves carrying information as a result of changes in the amount of electric power and thereby transmits and receives signals;
      two capacitors parallel-connected to the antenna coil;

a main circuit which processes a received signal obtained by demodulating an output of said resonant circuit and outputs a modulated transmitting signal to said resonant circuit;

a switch section which switches first one of said two capacitors between a connected state and a disconnected state; and a switch control section which controls switching operation of said switch section according to the amount of an output voltage occurring in said resonant circuit and according to a specific change in said output voltage, wherein the capacitance of the second capacitor is such that, when the noncontact communications medium is overlaid with another one with said first capacitor in the disconnected state in each noncontact communications medium, the frequency of said electromagnetic waves and the resonant frequency of the two noncontact communications media approximately march each ocher.

4. A noncontact communications medium comprising:

a resonant circuit including:

an antenna coil which generates an induced electromotive force by receiving electromagnetic waves carrying information as a result of changes in the amount of electric power and thereby transmits and receives signals; and two capacitors parallel-connected to the antenna coil;

a main circuit which processes a received signal obtained by demodulating an output of said resonant circuit and outputs a modulated transmitting signal to said resonant circuit;

a switch section which switches first one of said two capacitors between a connected state and a disconnected state; and a switch control section which controls switching operation of said switch section according to the amount of an output voltage occurring in said resonant circuit and according to a specific change in said output voltage;

wherein the capacitance of the second capacitor is such that, when the noncontact communications medium is overlaid with another one with said first capacitor in the disconnected state in each noncontact communications medium, the frequency of said electromagnetic waves and the resonant frequency of the two noncontact communications media approximately match each other; and wherein the capacitances of said two capacitors are such that, when said first capacitor is in the connected state, the frequency of said electromagnetic waves and the resonant frequency of said resonant circuit approximately march each other.

5. A noncontact communications medium comprising:

a resonant circuit including:

an antenna coil which generates an induced electromotive force by receiving electromagnetic waves carrying information as a result of changes in the amount of electric power and thereby transmits and receives signals; and two capacitors parallel-connected to the antenna coil;

a main circuit which processes a received signal obtained by demodulating an output of said resonant circuit and outputs a modulated transmitting signal to said resonant circuit;

a switch section which switches first one of said two capacitors between a connected state and a disconnected state; and a switch control section which controls switching operation of said switch section according to the amount of an output voltage occurring in said resonant circuit and according to a specific change in said output voltage;

wherein the capacitance of the second capacitor is such that, when the noncontact communications medium is overlaid with another one with said first capacitor in the disconnected state in each noncontact communications medium, the resonant frequency of the two noncontact communications media becomes higher than the frequency of said electromagnetic waves.

6. A noncontact communications medium comprising:

a resonant circuit including;

an antenna coil which generates an induced electromotive force by receiving electromagnetic waves carrying information as a result of changes in the amount of electric power and thereby transmits and receives signals;

two capacitors parallel-connected to the antenna coil;

a main circuit which processes a received signal obtained by demodulating an output of said resonant circuit and outputs a modulated transmitting signal to said resonant circuit;

a switch section which switches first one of said two capacitors between a connected state and a disconnected state;

a switch control section which controls switching operation of said switch section according to the amount of an output voltage occurring in said resonant circuit and according to a specific change in said output voltage;

wherein the capacitance of the second capacitor is such that, when the noncontact communications medium is overlaid with another one with said first capacitor in the disconnected state in each noncontact communications medium, the resonant frequency of the two noncontact communications media becomes higher than the frequency of said electromagnetic waves; and wherein the capacitances of said two capacitors are such that, when said first capacitor is in the connected state, the frequency of said electromagnetic waves and the resonant frequency of said resonant circuit approximately match each other.

7. A noncontact communications system comprising:

a noncontact communications medium which comprises:

a resonant circuit including:

an antenna coil which generates an induced electromotive force by receiving electromagnetic waves carrying information as a result of changes in the amount of electric power and thereby transmits and receives signals; and two capacitors parallel-connected to the antenna coil;

a main circuit which processes a received signal obtained by demodulating an output of said resonant circuit and outputs a modulated transmitting signal to said resonant circuit;

a switch section which switches first one of said two capacitors between a connected state and a disconnected state; and a switch control section which controls switching operation of said switch section according to the amount of an output voltage occurring in said resonant circuit and according to a specific change in said output voltage;

wherein said switch control section controls the switching operation of said switch section according to a change in a rising edge or in a falling edge of said output voltage when the output voltage occurring in said resonant circuit is equal to or higher than a specific value; and a communications apparatus which communicates with said noncontact communications medium by radio.

8. A noncontact communications medium comprising:

a resonant circuit including:
- an antenna coil which generates an induced electromotive force by receiving electromagnetic waves carrying information as a result of changes in the amount of electric power and thereby transmits and receives signals; and
- two capacitors parallel-connected to the antenna coil;

a main circuit which processes a received signal obtained by demodulating an output of said resonant circuit and outputs a modulated transmitting signal to said resonant circuit;

a switch section which switches first one of said two capacitors between a connected state and a disconnected state;

an end-of-polling command transmission detecting means which detects an end of transmission of a polling command occurring at a communicating station with which said noncontact communications medium communicates; and a switch control section which begins control operation for switching said switch section at the timing of detecting the end of transmission of the polling command if said end-of-polling command transmission detecting means detects the end of transmission of the polling command occurring at the communicating station when an output voltage occurring in said resonant circuit is equal to or higher than a specific value.

9. The noncontact communications medium as recited in claim 8, wherein said switch control section judges when performing the control operation for switching said switch section whether the output voltage occurring in said resonant circuit becomes higher when said first capacitor is set in the connected state or in the disconnected state, and holds said switch section in the state in which said output voltage becomes higher.

10. The noncontact communications medium as recited in claim 9, wherein said switch control section causes said main circuit to operate after holding said switch section in the state in which said output voltage becomes higher.

11. The noncontact communications medium as recited in claim 9, wherein said switch control section begins to supply an operating power source to said main circuit after the amount of said output voltage has reached a level sufficient for operating said main circuit with said switch section held in the state in which said output voltage becomes higher.

* * * * *